(12) United States Patent
Laplante et al.

(10) Patent No.: US 12,124,568 B2
(45) Date of Patent: Oct. 22, 2024

(54) PREVENTION AND REMEDIATION OF MALWARE BASED ON SELECTIVE PRESENTATION OF FILES TO PROCESSES

(71) Applicant: Assured Information Security, Inc., Rome, NY (US)

(72) Inventors: Sean Laplante, Rome, NY (US); Patrick McHarris, Rome, NY (US)

(73) Assignee: Assured Information Security, Inc., Rome, NY (US)

( * ) Notice: Subject to any disclaimer, the term of this patent is extended or adjusted under 35 U.S.C. 154(b) by 501 days.

(21) Appl. No.: 17/310,254

(22) PCT Filed: Apr. 20, 2021

(86) PCT No.: PCT/US2021/028095
§ 371 (c)(1),
(2) Date: Jul. 27, 2021

(87) PCT Pub. No.: WO2022/225508
PCT Pub. Date: Oct. 27, 2022

(65) Prior Publication Data
US 2023/0229761 A1    Jul. 20, 2023

(51) Int. Cl.
*G06F 21/55* (2013.01)
*G06F 21/54* (2013.01)
*G06F 21/57* (2013.01)

(52) U.S. Cl.
CPC .......... *G06F 21/552* (2013.01); *G06F 21/54* (2013.01); *G06F 21/554* (2013.01); *G06F 21/577* (2013.01)

(58) Field of Classification Search
CPC ...... G06F 21/552; G06F 21/54; G06F 21/554; G06F 21/577; G06F 21/566
See application file for complete search history.

(56) References Cited

U.S. PATENT DOCUMENTS 10,193,918 B1 *  1/2019  Patton ................... G06F 21/566
10,229,269 B1 *  3/2019  Patton ................... G06F 21/554
(Continued)

OTHER PUBLICATIONS

International Search Report and Written Opinion of the International Searching Authority for International Application No. PCT/US2021/028095 mailed on Jul. 14, 2021.
(Continued)

*Primary Examiner* — Robert B Leung
(74) *Attorney, Agent, or Firm* — Matthew M. Hulihan; Heslin Rothenberg Farley & Mesiti, P.C.

(57) ABSTRACT

Malware prevention and remediation is provided by monitoring actions performed by processes and maintaining indications of which processes are trusted; selectively presenting canary files to these processes, which includes presenting the canary files to processes not indicated as being trusted and hiding the canary files from processes indicated as being trusted, and where the monitoring includes monitoring for access of canary files with change privileges; scoring each of the processes based on the actions performed, including any access of canary files with change privileges, which scoring produces a malice score for each process; and automatically terminating any process for which its malice score indicates at least a threshold level of malice in the execution of the process.

35 Claims, 6 Drawing Sheets

(56) References Cited

U.S. PATENT DOCUMENTS

| | | | |
|---|---|---|---|
| 2015/0013008 A1* | 1/2015 | Lukacs | G06F 21/53 |
| | | | 726/24 |
| 2016/0371152 A1* | 12/2016 | Parshin | G06F 21/566 |
| 2018/0046799 A1 | 2/2018 | Kohavi et al. | |
| 2019/0034634 A1 | 1/2019 | Hajmasan et al. | |
| 2019/0108341 A1 | 4/2019 | Bedhapudi et al. | |
| 2019/0318079 A1* | 10/2019 | Sandoval | G06F 21/52 |
| 2019/0332766 A1* | 10/2019 | Guri | G06F 21/565 |
| 2020/0004977 A1 | 1/2020 | Araujo et al. | |
| 2020/0204589 A1* | 6/2020 | Strogov | H04L 63/1416 |
| 2020/0320195 A1 | 10/2020 | Lundgren et al. | |
| 2021/0160284 A1* | 5/2021 | Strogov | H04L 63/0245 |
| 2022/0027471 A1* | 1/2022 | Levy | G06F 21/6218 |
| 2022/0292195 A1* | 9/2022 | Holland | H04L 63/1491 |

OTHER PUBLICATIONS

Ballew, A., "Huntress Service: Ransomware Canaries", Jun. 24, 2020. Retrieved on Jul. 21, 2021 from the Internet URL: <https://blog.huntresslabs.com/huntress-service-ransomware-canaries-2f7f586b8f1e>, 5 pgs.

Abstract of "Canary Files: Generating Fake Files To Detect Critical Data Loss From Complex Computer Networks", Conference: The Second International Conference on Cyber Security, Cyber Peacefare and Digital Forensic (CyberSec2013) (Mar. 2013).

* cited by examiner

PREVENTION AND REMEDIATION OF MALWARE BASED ON SELECTIVE PRESENTATION OF FILES TO PROCESSES

CROSS REFERENCE TO RELATED APPLICATION

This application is the National Phase filing under 35 U.S.C. § 371 of International Application No.: PCT/US2021/028095, filed on Apr. 20, 2021. The entire content of PCT/US2021/028095 is hereby incorporated herein by reference in its entirety.

BACKGROUND

Conventional anti-malware solutions rely largely on virus signatures and/or extensive training to detect malware. Even still, malware regularly evades these solutions in practical applications. While some rely on local emulation sandboxes, these are prone to detection and evasion by malware. Moreover, most anti-malware solutions are bundled with more general-purpose enterprise applications and cannot be purchased separately.

SUMMARY

Shortcomings of the prior art are overcome and additional advantages are provided through the provision of a computer-implemented method. The method includes monitoring actions performed by each process of a plurality of processes when executing on a computer system, and maintaining, for each process, an indication whether that process has been determined to be a trusted process of the computer system. The method also includes selectively presenting canary files stored on the computer system to processes of the plurality of processes, where, for each process of the plurality of processes, whether to present canary files to that process is based on whether that process is indicated as being a trusted process. The selectively presenting presents the canary files to processes not indicated as being trusted processes and hides the canary files from processes that are indicated as being trusted processes. Monitoring the actions includes monitoring for actions to access any of the canary files with change privileges. The method also includes scoring each process of the plurality of processes based at least in part on the monitored actions performed by that process, including any actions by that process to access any of the canary files with change privileges. The scoring produces a malice score of that process. Additionally, the method includes automatically terminating each process, of the plurality of processes, for which the malice score of that process indicates at least a threshold level of malice in the execution of the process.

In some examples, the method includes analyzing the computer system, the analyzing including identifying a set of trusted computer programs as at least one selected from the group consisting of: (i) most frequently used computer programs by a user of the computer system, (ii) most recently used computer programs by the user of the computer system, and (iii) computer programs registered with the operating system as a default program for opening any of a set of predefined file types, where processes that execute the trusted computer programs are indicated as being trusted processes of the plurality of processes. This analyzing can further include identifying file system locations where the user stores user documents, analyzing the user documents to identify file types and similarities in file names, generating the canary files, where the generating uses at least one of the identified file types and similarities in file names in selecting files type and file name of each of one or more of the canary files, and storing the canary files to the computer system, where at least some of the canary files are stored to one or more of the identified file system locations.

Additionally or alternatively, monitoring the actions can include monitoring for calls to the operating system by the plurality of processes, the calls including calls for file information of a directory of the computer system, calls for access to files on the computer system, calls to access a registry of the operating system, calls for process creation and termination, and/or calls for thread creation and termination, the calls for thread creation including calls for remote thread injection. The selectively presenting can include, based on a call to query for file information of a directory of the computer system by a process indicated as being a trusted process of the plurality of processes, and on determining that the process is a trusted process: parsing a data structure for one or more references to one or more canary files in the directory, the data structure being returned by the operating system to the process in a call return, rebuilding the data structure to provide a rebuilt data structure that does not include the one or more references, and returning the rebuilt data structure as part of the call return to the process, where the call return does not indicate the one or more canary files to the process.

In some embodiments, monitoring the actions further includes monitoring for actions to: encrypt or delete one or more files, modify operating system files, create a remote thread in another process; reference to a registry of the operating system for a canary file of the canary files, and modify a canary file of the canary files using a deferred rename or delete operation, where differing monitored actions have associated therewith differing amounts by which the malice score of a process is adjusted when the actions are performed by the plurality of processes. Based on the process accessing a canary file with change privileges, the scoring can adjust the malice score of the process to indicate a level of malice meeting or exceeding the threshold level of malice, and the terminating automatically terminates the process.

In some examples, terminating a process also automatically terminates (or initiates the automatic termination of) any parent and/or child process of that process.

The scoring can further include scoring a process of the plurality of processes based on a directory where an executable for the process is stored, where based on the directory being a temporary storage location or a location where executables are not commonly stored on the computer system, the scoring adjusts the malice score of the process to indicate a greater level of malice.

Monitoring the actions can include monitoring actions performed by each thread of each process of the plurality of processes, where the scoring scores each thread based at least in part on the monitored actions performed by that thread to produce a malice score of that thread. The automatically terminating can include terminating a process based on the malice score of any thread of the process indicating at least the threshold level of malice, or a sum of the malice scores of the threads of the process indicating at least the threshold level of malice, as examples. In some embodiments, based on suspecting that a trusted process of the plurality of processes has been compromised by malware executing as part of an untrusted thread of the trusted process, the untrusted thread having been remotely injected into the trusted process by another thread/process, the selectively presenting hides the canary files from one or more trusted threads of the trusted process and presents at least one of the canary files to the untrusted thread of the trusted process, where the automatically terminating automatically terminates the process based on the untrusted thread accessing with change privileges any of the at least one of the canary files presented to the untrusted thread.

In some examples, a process of the plurality of processes is a parent process to one or more children processes, and the malice score of the process is a function of the malice score of the one or more children processes.

In some embodiments, the method includes backing-up files that are accessed with change privileges by any process of the plurality of processes. The backing-up could be limited by backup parameters to control which files accessed with change privileges are backed up, where the backup parameters specify a defined set of file types to backup and/or specify a file size limit on files to backup, as examples.

The backing-up of files could store backup files to a protected location that is protected by hiding backup files from processes. For instance, a method could hide from the plurality of processes the backup files stored to the protected location, where, based on a call to query for file information of the protected location, the hiding (i) parses a data structure for one or more references to one or more backup files in the protected location, the data structure being returned by the operating system to a process in a call return, (ii) rebuilds the data structure to provide a rebuilt data structure that does not include the one or more references, and (iii) returns the rebuilt data structure as part of the call return to the process, where the call return does not indicate the one or more backup files to the process.

In some embodiments, aspects of the above, for instance monitoring of actions, the selectively presenting, the scoring, and the automatically terminating, among possibly additional aspects, are implemented by execution as/of a kernel driver of an operating system executing on the computer system.

Further, computer systems configured to perform aspects described herein and computer program products storing instructions for execution to perform aspects described herein are also disclosed.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
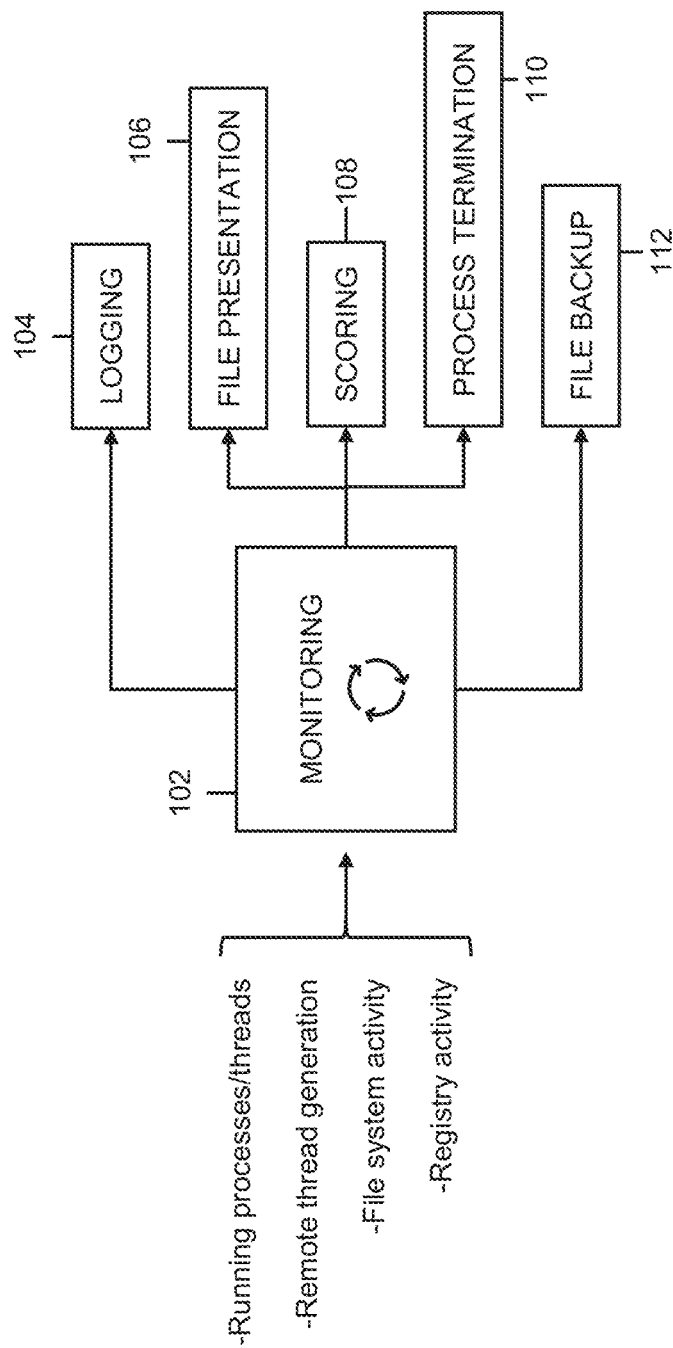
FIG. 1 depicts an overview of an approach for malware detection and remediation in accordance with aspects described herein.

Described herein are approaches for protection against malware, for instance prevention and remediation thereof, including the identification, blocking, termination, and removal of malware from a computer system. Malware ("malicious software") is software designed to cause damage to computer hardware/software components. Common examples include computer viruses and worms, ransomware, and spyware, among others. Ransomware typically encrypts and/or locks target data in an effort to extract from the data owner a ransom in exchange for the key to unlock/decrypt the data. Though numerous aspects discussed herein are presented in the context of ransomware, they apply with equal force and effectiveness to any kind of malware or malicious executing processes and threads.

As an overview, aspects present an antimalware software offering ("tool"), for instance in the form of a lightweight operating system (OS) kernel driver, that performs aspects described herein to dynamically identify and block the effects of ransomware and/or other malicious software. The malicious software could execute in user space (also known as user mode, or userland), in contrast to execution in kernel space (also referred to as kernel mode or privilege mode), for example. The identification of both new and existing malware occurs in part by monitoring process behavior in real time without relying on static malware signatures. The tool monitors and scores process and thread behavior based on observed malicious indicators. As a process executes by way of one or more executing threads, the tool scores actions by the process and/or individual threads, the actions being those that may commonly be exhibited by whatever type(s) of malware are being monitored-for. In the case of ransomware, actions commonly exhibited include file encryption and/or deletion. Access to hidden files is also a common action. The tool monitors various actions, scores them in terms of the level of malice they suggest, and terminates (kills; stops execution of) processes that meet or exceed a threshold level of malice. The threshold level is considered to be the line between non-malicious (safe) and malicious (unsafe). The tool also employs a secure backup mechanism as discussed herein that monitors for accesses to files on the system, for instance all files or a subset thereof, such as those deemed to be sensitive, and creates backups of those files to a secure backup location. A backup of a file may be triggered based on observing a request to access the file with change privileges. The backup (of the unchanged file) is made prior to the modification. In some embodiments, the tool tracks file change history using, as one example, the open-source Git capability, and ensures any local backup does not grow to consume a significant portion of the computer system's disk space. The secure backup location can be both protected and hidden from any/all processes desired that are running on the computer system, with the exception of select process(es) such that the process executing the tool itself on the computer system.

Conventional antimalware offerings that rely on virus signatures and/or training and classifiers are not effective in all scenarios and are prone to detection and evasion by malware. Further, conventional offerings lack any "just-incase" secure local/cloud backup mechanism directed specifically to the files are that being accessed by potential malware. In some aspects, the backups made as described herein can be handled automatically without the need for configuration, the files can remain hidden at an API-level, and on a process-by-process and/or thread-by-thread basis, even from system processes that have the ability to view files marked by the OS as being 'hidden' files.

FIG. 1 depicts an overview of an approach for malware detection and remediation in accordance with aspects described herein. The tool executes on a computer system and provides in-line analysis and alerting, among other activity. For instance, a monitoring component 102 monitors actions performed by processes running/executing on the computer system. Varying processes and threads thereof perform varying actions, and actions/events of desired types can be monitored-for. The tool maintains an internal state for each of the monitored processes, which can include an indication of whether that process has been determined to be a trusted process of the computer system, as explained in further detail herein. Example actions that are monitored are calls of varying types made to the OS by the processes, for instance calls that perform file system activity such as listing files/folders in a directory, registry activity such as writing or referencing to files in the registry of the OS, and process/thread creation and deletion, including creation of remote threads (remote thread injection).

The tool performs processing based on the monitoring and on the actions/events that are observed. This processing includes:

Logging 104 the events—Event information can be logged for later use;

Selectively presenting 106 so-called canary files stored on the computer system to processes/threads—Canary files are files either generated by the tool and/or placed by the tool onto the computer system. The sole or primary purpose of the canary files may be to aid in monitoring threads/processes for malicious activity. Canary files are in contrast to user documents/data that is generated and stored by the user directly or by legitimate programs with which the user interacts to produce the user data. Canary files may be referred to by many different names, includes honeyfiles, honeytokens, red herring files, and decoys documents/files, among others. Whether to present canary file(s) to a process can be based on whether the process is indicated as being a 'trusted' process, which is a concept detailed further below. In handling calls for file information of a directory containing canary files, the tool can cause the presentation of the canary files to processes not indicated as being trusted processes, and hide the canary files from processes that are indicated as being trusted processes. The monitoring of actions performed against files on the computer system can therefore include monitoring for actions to access any of these canary files with specific privileges, such as change privileges. Change privileges include any privileges that would enable the process to change the file—renaming, deleting, overwriting, changing file attributes such as file extension, etc.

Scoring 108 the actions as indicators of malicious activity—The tool scores each process based on the monitored actions (exhibited as events) performed by that process, which actions/events can be scored according to how strong an indicator they are of potential malicious activity. The actions include, but are not limited to, actions by the processes to access any of the canary files with change privileges as noted above. This scoring of each process based on the actions it performs produces a malice score of that process;

Terminating processes 110 if their malice score reaches a threshold—The tool can automatically terminate any process for which the malice score of that process indicates at least a threshold level of malice in the execution of the process; and Backing up 112 files prior to modification by a malicious process in order to provide an unmodified original version of the file—The tool can monitor for accesses requesting change privileges to files, and on the basis of seeing a request for such an access by a process, proactively backup that file to a secure backup facility.

In some examples, the monitoring 102 and processing 104-112 is implemented by processing/execution as a kernel driver of the operating system executing on the computer system.

Monitoring actions includes monitoring for process interaction with canary files. A process perform actions via execution of one or more thread(s) of the process. Interaction with canary files, and especially interaction by a userland application attempting to access a canary file with change permissions to effect a change thereto, may be deemed particularly suspect in light of the canary file hiding explained herein. The canary files are not generally presented to all processes on the system. Instead, their presence is hidden from various applications executing as processes and threads. In general, the canary files are to be hidden from any processes/threads that are expected or believed to be operating based on legitimate use and/or interaction by or on behalf of the user. In other words, a user's own actions against files by way of computer programs that the user uses are generally to be regarded as trustworthy and not malicious. Those applications that a user would use to interact with files are examples of 'trusted' processes. Since canary files are not user files with which it is expected a user would want to interact, the tool hides the canary files from the user (i.e. processes/threads operating at the behest of the user) in order to prevent interaction by the user with those files. On the basis of this selective hiding of canary files from userland applications that are considered trusted, while presenting them to applications that are not explicitly considered trusted, then any interaction by a usermode application from which the canary files are not hidden to perform suspect actions like encrypting, renaming, overwriting, or other changes to the file can be assumed to be malicious. In effect, a usermode application that requests to open a canary file for write access is assumed to be acting maliciously. Thus, one of the mechanisms of the tool to identify malware, for instance ransomware, is looking for attempts to interact with and effect changes to canary files.

Figure 2:
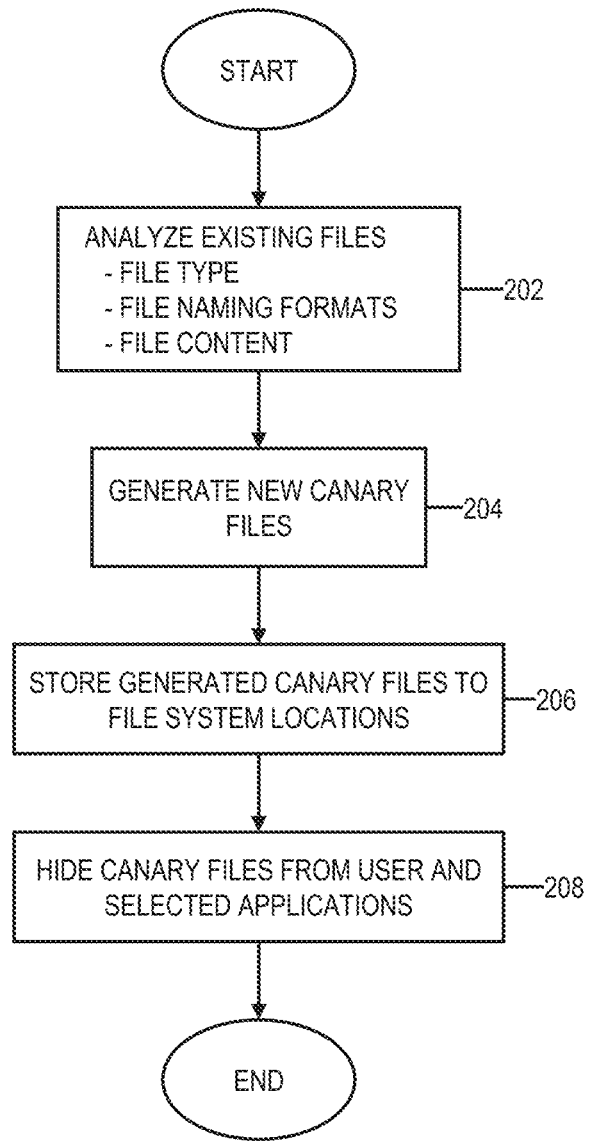
FIG. 2 depicts an example process for canary file generation and handling in accordance with aspects described herein.

In some embodiments, the tool when installed analyzes the user's environment on the endpoint/computer system and automatically generates a configuration specifically tailored to that endpoint. An aspect of this is canary file generation. FIG. 2 depicts an example process for canary file generation and handling in accordance with aspects described herein.

The process, in analyzing the computer system, analyzes (202) existing files on the computer system. This analysis can identify file system locations (e.g. where the user tends to store user documents and data, and locations for other files that may be statistically likely to be targeted by malware), file types, and similarities in file names such as file naming formats, patterns, syntaxes, and the like. Optionally, the analyzing can also analyze content within these files, with the content to be used in generating canary files and/or to inform of the types, nature, or subject matter of content to be used in the generated canary files.

The process proceeds by generating (204) new canary files. In generating the canary files, the selection of the file type(s) and/or file name(s) of some or all of the canary files can use any of the identified file types and/or similarities in file names that were detected as part of the analyzing (202). If the user has several .xlsx files in the user's Documents folder, this suggests to generate some .xlxs canary files in an effort to produce fake files that look to malicious software like user data. If user content (data within user files) is also analyzed, this too could be used in generating the canary files, for instance to place some user content into one or more canary files. In this manner, the tool can generate canary files with realistic names and (optionally) content based on the subject computer system. Canary files can be 'filled' with content that looks like other user file content on the system, though use of user content may be done with proper content sanitation/anonymization if desired. Alternatively, file content could be selected more randomly and less specific to the user's content. As an example, documents, such as .docx files, could be created and filled with random words from English language.

The canary file generation may therefore be tailored specifically or generally to this particular computer system based on the user(s) thereof. The generation of the canary files can follow the general desire for the canary files to appear to malicious software as realistic data in terms of file type, naming, and/or subject matter/content, and could utilize any approach for file/content generation.

In generating canary files, it can also be ensured that the generated files maintain the correct file media type (also referred to as MIME type). Thus, a .docx file, referring to a proprietary file format created by Microsoft Corporation of Redmond, Wash. for use with its Microsoft® Word software, can be generated to be valid and readable by the Microsoft® Word software (MICROSOFT is a registered trademark).

Continuing with the process of FIG. 2, the process stores (206) the canary files to the computer system. The canary files can be stored in any desired location(s), such as directories that are commonly used by the user to store user data. In some specific examples, at least some of the canary files are stored to one or more of the identified file system locations where user data/documents are commonly stored. Additionally or alternatively, canary file(s) can be stored to randomly selected directories on the computer system's hard drive(s), in any/all directories thereof, and/or in any locations that are known to be targets of specific malware or malware generally. System root paths—the root of a drive (root of C: or D: or any other drive)—could be a good location to store canary files because ransomware in particular tends to begin malicious activity at the root of a drive. Placing canary files in a location that promotes early interaction by the ransomware can help to identify it earlier.

As part of the analyzing (202) or as part of a separate analysis, a process can analyze the computer system for other information that informs of trusted processes of the system and identify a set of trusted computer programs/applications/executables. Example types of trusted computer programs include:
(i) programs that are most frequently used by user(s) of the computer system. By most frequently used is meant those programs that a user or set of users uses with at least some frequency or consistency, such as daily or weekly. They may be identified by analyzing program usage over time and/or by accessing a list of frequently used programs as kept by the OS, as examples;
(ii) programs that are most recently used by user(s) of the computer system. By most recently used is meant those programs whose execution was initiated by the user most recently as defined by some period of time, such as within the last 5 days, or during the last 3 three sessions during which the user was logged on, as examples;
(iii) programs that are registered with the OS as a default program for opening any of predefined file types, examples of which can include but are not limited to: .doc/.docx, .pdf, .jpg, .mp3, etc.; and
(iv) programs that are known, system-level and/or trusted executables, for instance ones that are commonly part of the OS such as "explorer.exe" in the Windows® line of operating systems offered by Microsoft Corporation (of which WINDOWS is a registered trademark).

Any or all of the above can inform of the programs, on the system, that should be considered trusted. It is not necessarily the case that each type (i)-(iv) noted above will be considered trusted; in some embodiments only one or multiple, but not all, of the above types of programs are considered trusted. Alternatively, other types of programs not mentioned above may be taken as trusted, if desired.

In any case, the processes/threads that execute those identified trusted programs are indicated to be trusted processes of the computer system. The general desire in identifying trusted programs and processes may be to identify any that the user is expected to use/interact with in such a way that it is desired to hide the canary files from that process in order to prevent user interaction user with them. Interaction with a file by a user of the computer is assumed to be non-malicious.

Returning to FIG. 2, once the canary files are created and stored to the computer system, the tool (implemented as a filter driver for instance) hides (208) the canary files from the user and various applications, for instance the set of programs (the processes/threads) considered to be trusted. This prevents the user from seeing the canary files via the trusted application, thereby greatly reducing the chance that a user accidently interacts with a canary file. Such interaction could be taken (falsely) as an indication of malicious activity.

Rather than (or in addition to) marking canary files as hidden files with the OS, the canary files can be hidden selectively, and according to which process is attempting to see the canary files. The hiding can be at an API-level by the tool operating as a kernel level driver, as explained in further detail below. On the basis that an executing malicious program would not be indicated as a trusted program, that malicious program would see the canary files when querying for a directory listing or performing other actions to identify files that exist on the system. Legitimate, trusted processes would not see the canary files because they would be filtered from presentation to those trusted processes. In this manner, a malicious process that infects a computer system already running the tool will not be regarded as a trusted program—the user has not previously used that malicious process for instance—and will be presented the canary files in its attempts to corrupt, encrypt, or change files in directories where the canary files reside. Often malicious software, and particularly ransomware, seeks to tamper with a significant number, if not all, files on the computer system, and in particular files that it takes to be user data.

Since canary files are hidden from trusted processes and presented to other processes, any process that attempts (by way of a request for a file handle for instance) to interact with any canary file with change access/privileges can be automatically terminated. Since the tool executes in kernel space, it has privileges to effect such termination. In this way, the tool utilizes canary files for prevention and automatic remediation of malicious software remediation, as opposed to just detection and logging, for instance.

Some or all aspects of FIG. 2 could be performed by the computer system on which the tool executes and/or by one or more other computer systems. Example other computer systems are remote systems that perform the analysis (202), perhaps based on data supplied by a client executing on the computer system, and/or generation (204) of the canary files, and provides the canary files to the computer system to store locally thereon. A remote system might indicate to the computer system where to store the generated canary files as part of providing the generated canary files to the computer system. Thus, aspects of FIG. 2 could be provided as a service by one or more servers remote from the endpoint to be protected.

Analysis of the computer system could be conducted periodically or aperiodically to update any information gathered therefrom, for instance indications of trusted processes or updated user document/data information. Optionally, canary file generation and storage could be performed again using the updated information, if desired. In this manner the tool can refresh the markers that is uses to protect the system, tailor the canary files on the system, and refresh its trusted programs list to any evolutions in how the user users the system and/or data thereon The tool can use an API manipulation technique to implement file hiding. The technique can be used to hide any desired files on the system, such as canary files, backup files as described herein, and any system/configuration files, among others as desired. The tool can have prior knowledge of which files are canary files and the directories in which canary files are stored. As part of monitoring (FIG. 1, #102) the actions by processes, the tool can monitor for calls to the OS by the processes. The monitored calls could be those of specific call types, for instance calls for file information of a directory of the computer system. In a Windows® environment for example, the tool could monitor for an I/O Request Packet (IRP) corresponding to a call to query for directory information with a supported file information class. A directory control information IRP is presented any time a user mode process requests a directory listing. A directory listing can be requested in different file information modes to request differing levels of information. The tool can monitor this as a 'middle man' in order to control what threads/processes are presented information about canary files and are therefore alerted to the presence of the canary files. A specific embodiment of performing a file hide operation further to the selective presentation of canary files is as follows: When a call to query for file information of a directory of the computer system is made by a process, the tool, acting as a filter driver, can hook into the OS's call processing and determine whether it regards the calling process as a trusted process for which filing hiding is to be implemented. Then, based on the call and on determining that it was made by a trusted process, the tool can parse the parameters of the IRP for the file information mode to figure out what information is being requested by the calling process, and then pass the call along to the OS function to perform call processing and issue a call return. The OS, as part of its call processing to service a directory information call, populates a list in a result buffer of memory to return as part of the call return. The list's entries/elements correspond to files in the directory. The tool can monitor for the return of the IRP (which is now populated with the return information) and then walk the result buffer referred-to by the IRP. The result buffer contains a data structure or structures composing the list of files in the subject directory as it was populated by the OS, and the tool's walk of the result buffer parses the data structure(s) in the buffer. It rebuilds data structure(s) to hide desired files from the calling process. For instance, it parses a data structure for reference(s) to canary file(s) in the directory and rebuilds the data structure to provide a rebuilt data structure that does not include the reference(s) and/or is otherwise built such that the calling process is unable to identify and/or access the files that are to be hidden from it.

The tool can rebuild the list in another memory space according to the structural properties in which the OS builds the original list. At that point, the rebuilt list can be returned to the calling process by way of the call return. In some embodiments, the tool zeros-out the memory of the original result buffer composed by the OS's call processing and copies into that original result buffer its rebuilt list with the entries corresponding to the files to be hidden removed. Thus, when the OS passes a user buffer of a certain size and filled with the entries corresponding to files in the directory, the tool iterates over the entries, removes/copies entries for files to be presented and places them into another buffer containing the list being rebuilt, leaves the entries corresponding to the files to be hidden, then zeros-out the original user buffer so that it is 'empty', copies in the sanitized, rebuilt list into the memory space for that user buffer, then returns the result to the calling process where the call return does not indicate to the calling process the files that were to be hidden.

By zeroing-out the original buffer memory space, the entries are removed and overwritten. This can help to avoid an attack that analyzes memory and becomes aware of the hidden files by seeing the entries in the original buffer. The tool can also modify an indication of the expected length of the call return to be the length of the new, rebuilt list, and allow the IRP return to complete.

In another embodiment, the rebuilt list is not copied into the original memory space buffer used by the OS to store its built list but is instead composed in a different memory space buffer that is returned to the calling process. In this way, the buffer returned to the calling process never contained the entries corresponding to the hidden files. The entire original buffer could be zeroed-out as above.

In yet another embodiment, the rebuilding entails unlinking from the list returned by the OS any entries for files to be hidden, and then zeroing-out the memory locations storing those unlinked entries. This may be undesirable in situations where it might raise the suspicion of a malicious process, and for that reason may not be preferred to the approach explained above.

The tool can perform the above actions prior to the calling process resuming its execution. The actions to hide the desired files can therefore occur completely transparently to the calling process and its executing thread(s).

The tool can maintain internal state for all running processes on the system in connection with monitoring actions by those processes. The tool utilize hooks to monitor file, process, thread, and registry operations. Based on observed process behavior, the tool scores the processes and threads by assigning scores to the actions they invoke or perform. The scores of the actions taken by a thread can influence the score of that thread as well as the process of which that thread is a part. The score of a process can influence the score of any parent process(es) of that process and/or child process(es) of that process.

The operations/actions monitored and metadata about those can be logged, if desired. In a specific embodiment, a list of all running processes is maintained as a tree structure with linked lists relating processes and threads. Information maintained about running processes include process name, path, malice score, any backing file if present, any loaded modules for the process, and/or any other desired information. The tool can maintain state of all running threads, not just those indicated as trusted or not trusted.

The actions monitored can include actions to: encrypt or delete one or more files, modify operating system files, create a remote thread in another process, reference to a registry of the operating system for a canary file of the canary files, and/or modify a canary file using a deferred rename or delete operation, as examples. A deferred rename or delete is when an application uses a call (the "MoveFileEx" API call in the Windows® line of operating systems) to move a file but delay the move until reboot. This causes the move to be deferred until reboot. This API call can also be used to delete the file if the destination file name is set to NULL when the MOVEFILE_DELAY_UNTIL_REBOOT flag is used. The API call creates a registry key and registers the rename or delete in that registry key. The tool as described herein can monitor for registry read/write/modify and check if that key is being written-to with one of the canary files. If one of the canary files is indicated in the "PendingFileRenameOperations" registry key, the tool can remove it from the key and trigger logic that kills the process making the call.

Differing monitored actions have associated therewith differing weights or amounts by which a malice score of a process (and/or thread) is adjusted when performed by the process/thread. Requesting change privileges on a canary file can carry a large weight—one that results in immediate termination for example. Other actions such as remote thread injection might carry smaller weight. The actions of threads/processes are scored these scores are used to adjust the malice scores for these threads/processes using any desired function.

Malice scoring could be at the thread-level and/or the process level. When a malicious indicator such as one mentioned above is detected, the malice score of the thread performing the indicator may be adjusted to reflect a higher level of suspected malice for that thread. In some examples, the adjustment is to increment the malice score, where the greater the malice score number, the more malicious the thread is deemed to be. A threshold value can be set such that if the malice score meets or exceeds the threshold, then the tool automatically terminates the process in which the thread executes. Optionally, an increase in the malice score of a thread can dictate an adjustment to the malice score kept for the process in which the thread executes. Therefore, as part of monitoring actions by any monitored process, this can include monitoring actions performed by each thread of that process, and scoring the process can score each thread based at least in part on the monitored actions performed by that thread, in order to produce a malice score of that thread, which then in turn might influence the malice score of the process. The malice score of the process (in contrast to the malice score of any individual thread) might be a score against which a threshold operates, such that if the process malice score meets or exceeds the threshold then the process is automatically terminated by the tool.

An adjustment to a process malice score might in turn affect a malice score kept for the direct parent of that process. This adjustment can continue to bubble-up to higher-level parent processes, if desired. In this manner, the malice score of a process that is a parent process of a child process may be a function of the malice score of its child/children processes. The relation between a process score and score(s) of its children might vary on a process-by-process basis. For instance, the malice score of a trusted process (such as explorer.exe) that happens to have a suspect thread that was remotely-injected into it (as explained further below) might not be a function of the malice score of the suspect thread.

In some examples, the threshold level of malice to result in automatic termination of a process may be consistent across processes. Alternatively, different threshold levels of malice may apply to different processes and/or threads, or processes at different levels of the process hierarchy, which thereby varies the level of malice that a given thread or process must exhibit before the tool automatically terminates it. A greater accumulated level of malice might be acceptable for an otherwise trusted process than would be for a process that is untrusted, for example. A parent process might need to exhibit a far greater level of accumulated malice (as a function of the malice of all its child processes) before it is terminated in comparison to the level of malice it takes to result in any individual child process to be terminated, as another example.

Whether to terminate a process can be based on the malice score of the process and/or on malice scores of the thread(s) of the process. A process therefore might be terminated based on the malice score of any individual thread of the process indicating at least some threshold level of malice. Alternatively, a process might be terminated based on some function (such as the sum) of the malice scores of all thread(s) of the process indicating at least some threshold level of malice.

Any threshold representing the line between a safe malice score and a level required to result in automatic termination of the process can be determined and/or based any desired approach. In some examples, it might be based on results of testing and/or reverse engineering existing malware samples, though any suitable approach could be used.

In a specific embodiment, any process with a cumulative malice score that exceeds the safe threshold will be terminated. The automatic termination of a process can proceed as follows: First, examine the malice score of the process. If the malice score meets or exceeds the threshold, then terminate the process. Otherwise, examine the malice score(s) of the thread(s) of the process. If any thread's malice score meets or exceeds the threshold, terminate the process. If not, sum the malice scores of the threads and if the sum meets or exceeds the threshold, terminate the process. If the malice score of a parent process influences whether to terminate its child processes (perhaps when terminating the parent process if appropriate), then the evaluation whether to automatically terminate processes might start with a parent process's malice score, compare it to the threshold, and either terminate the parent process and its child processes if the threshold is met or exceeded, or move on to evaluate each child process as above.

A threshold level of malice is therefore a marker that either is, or is not, met (or surpassed). If the malice scoring is such that the score increases as malicious actions are observed, then the threshold could be set at a higher number that, if reached by a malice score, results in process termination. The scoring in that manner is designed such that a higher number means greater suspicion malice. As an alternative, each process could start at some initial score representative of trustworthiness and decrease/diminish as malicious actions are observed. The score is still appropriately a 'malice score' except that a lower score indicates more malice. The threshold in such a downward-going approach is set to some lower score and when a process malice score dips to at or below that threshold level, then the process is terminated. In this sense, the malice score has 'exceeded' (in the downward direction) the threshold. 'Exceeding' a threshold therefore need not necessarily mean meeting or surpassing some number by a greater number; it instead can mean moving in some direction toward the threshold level and meeting or overtaking that threshold.

As noted above, access to canary files is one behavior for which the tool can monitor. In some embodiments, access for read operations does not result in any adjustment to the malice score. Legitimate processes like those executing antivirus software seek to read all files on the file system and therefore should not be targeted for automatic termination on the basis of canary file reading. If, however, a canary file is accessed for change/write access (as opposed to a non-change access, such as a file read), then this access can be regarded as malicious per se, and optionally result in immediate. automatic termination on account that the malice score of the process is adjusted to immediately meet/exceed the threshold level. The malice score for the process accessing the file could be set to a maximum malice score to trigger the tool to terminate the process. Based on a process accessing a canary file with change privileges, the scoring of the process adjusts its malice score to indicate a level of malice meeting or exceeding the threshold level, and this results in automatically terminating the process.

In some examples, the tool hooks into facilities of the OS in order to monitor accesses to canary (and any other types of) files of the computer system. This can be done by hooking process calls to open file handle(s), where the calls are presented in an IRP in the Windows® line of operating systems, as one example.

While a request for access to change a canary file is an example action that might result in immediate automatic termination of the requesting process, there are other behaviors that may not result in immediate process termination. The tool can monitor for a process executing out of a non-standard or temporary location, referring to the directory where the process executable is stored, and the score of the process can be based on where that executable for the process is stored. In the case of being in a temporary storage location, such as an operating system temp folder, or a location where executables are not commonly stored on the computer system, scoring the process can adjust its malice score to indicate a greater level of malice. This need not increase the malice score to surpass the threshold but instead could combine with scores from other properties or actions of the process, with the combination potentially cumulatively exceeding the threshold. Other actions that may be monitored and affect a process's malice score include the process's modification of system files, such as an OS's 'hosts' file.

Another property that might affect a process's malice score is recognizing that it instantiates thread(s) of others processes and/or has thread(s) injected remotely into it by another process. When the tool detects creation of such a remote thread, it can score this against both the thread/process creating the remote thread and the target remote thread/process itself. Hollowing-out or hijacking another thread or process, referring to one process's modification or erasure of another process's memory and placing itself into it, can also increase the malice score of the source and target processes/threads. This helps the tool to follow malware around a computer system if the malware migrates between processes in an attempt to avoid detection.

Canary files may be hidden from all thread(s) of any process indicated as trusted, though it may also be true that the tool can monitor trusted processes and actions by threads thereof for indicators of potential compromise in order to detect and prevent malware that might inject itself into trusted processes by selectively presenting canary files to selected threads of a trusted process. An otherwise trusted process may be suspected of having become compromised, for instance if a thread of the trusted process has a malice score indicating at least some level of potential of malice. The thread itself may not be regarded as trusted. An example of this is when the thread of the trusted process was remotely injected into the trusted process by another thread/process. Using the explorer.exe process as an example, the explorer.exe process, a generally trusted process in the Windows® environment, performs actions that include presenting files to the user. If explorer.exe has a thread injected into it by a piece of malware executing as another process on the system, that thread of explorer.exe might be regarded as a suspect, or untrusted, thread of the otherwise trusted process explorer.exe.

The selective presentation of canary files on the system can, in such a situation where a trusted process includes both trusted and suspect threads, hide the canary files from the trusted thread(s) of that trusted process—the threads that are native/created by that process for instance—and present canary file(s) to the untrusted thread(s) of the trusted process. Canary file hiding with respect to an otherwise trusted process can be turned off in this sense for any suspect thread(s) of that process. The tool continues to hide the canary files from trusted thread(s) of that process, for instance to ensure that the user does not interact with a canary file. As part of the tool's termination of processes meeting the malice threshold, the tool can terminate the trusted process based on the untrusted thread accessing with change privileges any of the canary file(s) presented to the untrusted thread. This per-thread hiding can be used to hide not only canary files but any other desired files of the system, for instance backed-up files as discussed elsewhere herein.

Figure 3:
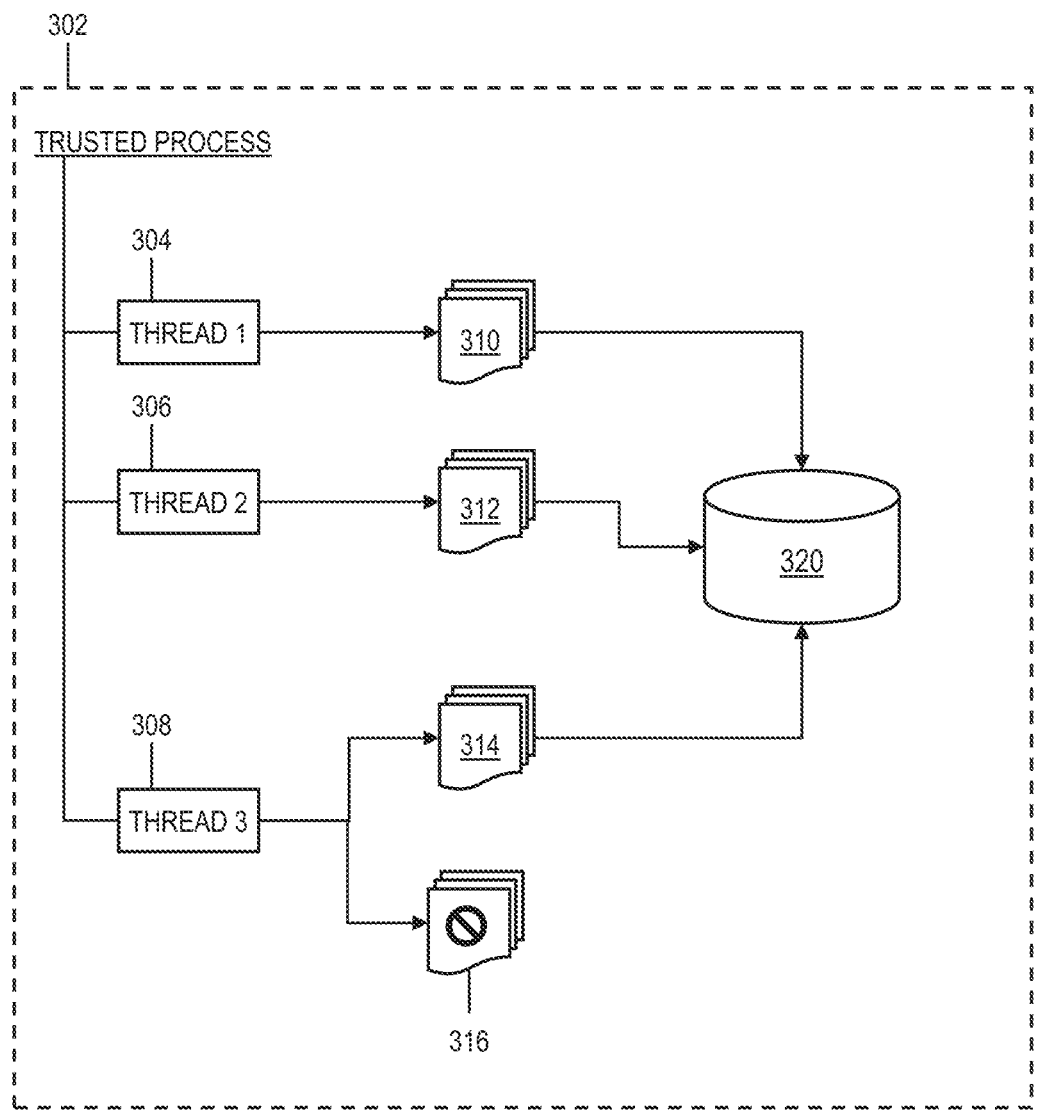
FIG. 3 depicts an example conceptual diagram of file-hiding on a thread-by-thread basis for a trusted process, in accordance with aspects described herein.

Further details of file-hiding on a thread-by-thread basis for a trusted process in accordance with aspects described herein are described with reference to FIG. 3, depicting an example conceptual diagram of this approach.

Trusted process 302 includes, by way of example, three executing threads 304 (Thread 1), 306 (Thread 2) and 308 (Thread 3). Thread 1 and Thread 2 are each provided visibility to file system files 310 and 312 respectively, which may or may not be the same set of files on the system. In a typical embodiment, files 310 and 312 would include any files that are not hidden in accordance with aspects described herein (e.g. canary files, backup files, files of the tool itself) and any files hidden from them by the operating system. By 'provided visibility' is meant that the files/file information would be presented to the thread if the thread requests it, for instance if the thread requests information about files stored in a given directory. In this sense, the thread has access to these files but may or may not actually become aware of their presence or interact with them unless browsing directories of the file system.

In some aspects described in further detail elsewhere herein, whenever a thread/process accesses a file with change privileges the file can be backed-up to secure data store 320 prior to any such changes being made by the thread/process. For example, this is triggered automatically based on observing a call to open a file handle with such change privileges. This provides a backup of the file in case it is later discovered that the thread or process is malicious; a backup of the file is available to restore.

Thread 3 of process 302 is regarded as a suspect thread, for example one that was remotely injected into process 302. The thread may continue to be given file system access and therefore presented files 314, and any files that it accesses with change privileges will be backed-up to the secure data store 320 as above. However, thread 3 will also be presented canary files 316 when requesting files/file information where canary files are stored. The canary files are not hidden by the tool when thread 3 queries for such file information and therefore may attempt to access them with change privileges which results in termination of the process 302. No backup is made of the canary files that the untrusted thread accesses with change privileges in this example, though backup of these canary files is a possibility if desired.

In addition to direct access by processes to canary files, the tool can also monitor for indirect access by processes to canary files. An example of this is a process's reference to known canary files in the operating system registry, for instance in an attempt to manipulate canary files utilizing deferred rename or delete operations as discussed above. These can be detected and blocked by the tool, while increasing the malice score of the process and optionally resulting in immediate process termination.

An aspect of the protection against malware and its effects as discussed herein is the proactive backup of files in real-time as they are accessed by processes executing on the system. If a process opens a file handle requesting change permissions for the file, the possibility exists that the file may be (maliciously) changed. The file can therefore be backed-up as a hedge against potential malicious corruption of the file. The backup occurs prior to any actual or attempted change to the file, and therefore occurs even if the requesting process does not make any attempt to actually change the file at any point despite having requested a handle that would have allowed file modification. If instead the process opens a file handle requesting only read permissions, then the file need not be backed up (though it could be if desired).

The scope of the backup can be limited such that not all files will be backed-up even if accessed with change privileges by a process. In this regard, the backup can be limited by parameter(s) to control which files accessed with change privileges are actually backed up. An example such parameter is a file size limitation, where a user, administrator, or other entity specifies a maximum and/or minimum file size for any file to be backed up. By way of specific example, the file size parameter might specify 25 megabytes (MB) to dictate that only files 25 MB or smaller that are accessed with change privileges are backed-up. Another example parameter is file type used to dictate which file types (e.g. as denoted by file extension) to always backup and/or to never back up. A list of default file extensions to always back up might include one or more of the following, among others: aes, avi, 3fr, accdb, ai, arw, bay, bmp, cdr, cer, cr2, crt, crw, dbf, dcr, der, dng, doc, docm, docx, dwg, dxf, dxg, eps, erf, indd, jpe, jpg, kdc, mdb, mdf, mef, mp4, mrw, nef, nrw, odb, odm, odp, ods, odt, orf, p12, p7b, plc, pdd, pdf, pef, pem, png, pfx, ppt, pptm, pptx, psd, pst, ptx, r3d, raf, raw, rtf, rw2, rwl, srf, srw, wb2, wpd, wps, xlk, xls, xlsb, xlsm, xlsx. Yet another example type of parameter is specific folder/location that dictates to always (or never) backup files in the specified location(s). These are just example parameters; others are possible, including any parameters centered around common file attributes/properties/metadata, such as modification date, creation date, creator, ownership, tags, etc.

Hiding of backup files stored in the secure/protected location can follow the approach described above with respect to hiding canary files, both in terms of which processes/threads to hide backup files from and the technical approach to performing the hiding. The backup files can be hidden at an API-level by the tool such that, based on a call to query for file information of a protected location where backup files are stored, hiding the backup files includes parsing a data structure returned by the operating system as part of the call return for references to the backup files in that location, rebuilding the data structure to provide a rebuilt data structure that does not include the references to the backup files in that location, and then returning to the process the rebuilt data structure as part of the call return that does not indicate the backup files.

The backup files could be stored to any one or more locations collectively referred to herein as the "secure backup location" or "protected location". This could be only location(s) within a file system of the particular endpoint computer system, or could include one or more remote locations, such as network or cloud storage as examples.

The tool as described herein uses canary files in the effective prevention and remediation of malicious software. The tool can provide any desired alerts to a user after an action and/or application/process is blocked. While conventional use of canary files provides logging and potentially alerting when canary files are accessed, a problem remains that a user or other non-malicious entity may intentionally or inadvertently interact with a canary file and thus create a false-positive indication of malicious activity. Automatic actions (process termination for instance) in response to canary file access could potentially cripple the system if a non-malicious actor such as a user browsing documents on the system could so easily access the canary files. In contrast, aspects described herein can appropriately assume access to a canary file with change permissions is malicious per se because of the selective presentation of the canary files, and more specifically hiding them from known legitimate (trusted) threads and processes. Meanwhile, process activity is continually monitored in case a trusted process is suspected of compromise by a malicious thread and files are backed-up automatically in real time in case a malicious actor corrupts important files prior to being terminated.

Aspects advantageously provided by the tool in accordance with aspects described herein include:
  minimizing user interference and eliminating false positives by ensuring trusted applications do not see the canary files and therefore do not have an opportunity to accidentally trigger protections (e.g. process termination) by the tool;
  monitoring all applications (trusted or not) to track and block malware that may attempt to migrate into the context of a trusted application, in which case the tool shows canary files only to the untrusted thread(s) of an infected application; and
  implementing an automated secure backup of a user's files.

In some specific embodiments, the tool requires no special configuration by a user—an end user installs the tool as any other program with the operating system and the tool works automatically. The tool can automatically configure itself, including which file extensions are to be protected, and generate the canary files after analyzing the target installation environment. The computer system need not utilize any emulation environment, as processes and threads can be analyzed and scored within the real system/host. Meanwhile, no antivirus or malware signatures are necessary.

Figure 4:
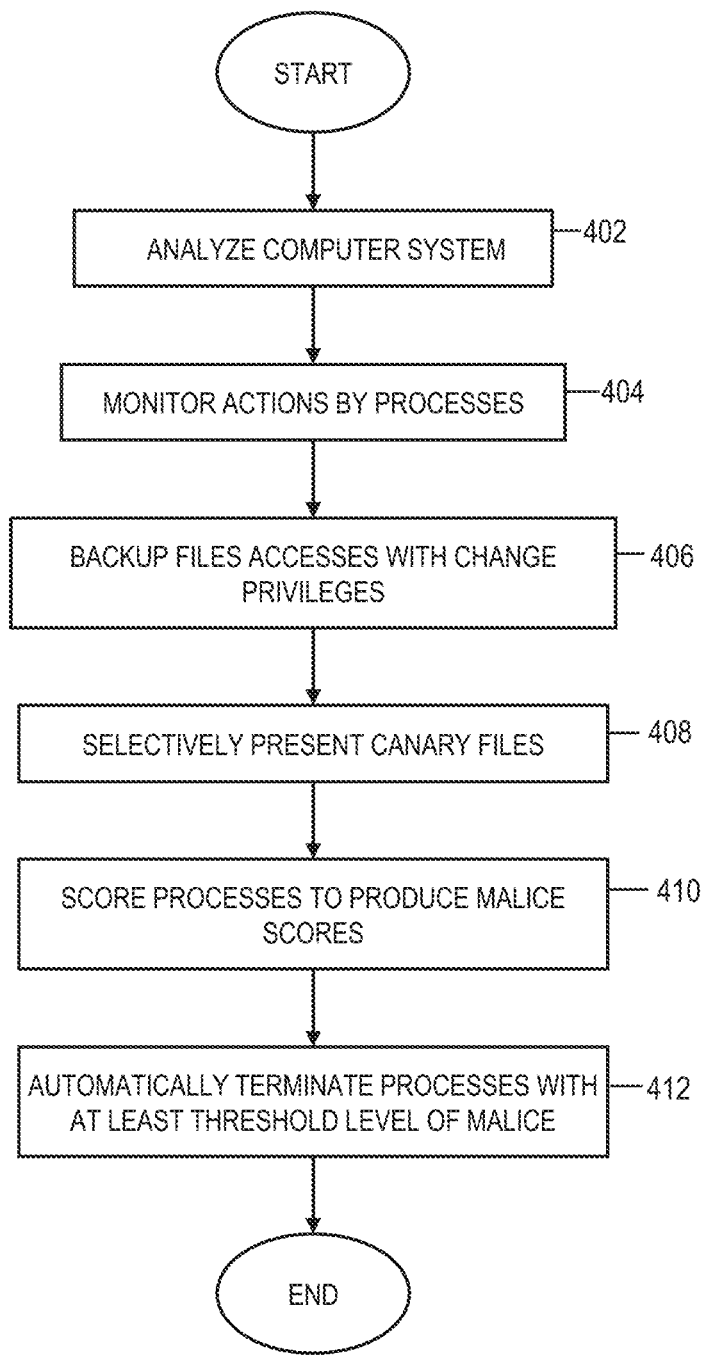
FIG. 4 depicts an example process for prevention and remediation of malware based on selective presentation of files to processes, in accordance with aspects described herein.

FIG. 4 depicts an example for prevention and remediation of malware based on selective presentation of files to processes, in accordance with aspects described herein. In some examples, the process of FIG. 4 is performed by a user's computer system, such as those described herein, which may be an endpoint on which protection and remediation of malware is desired. The endpoint could have an operating system kernel driver installed that performs aspects of FIG. 4. In other examples, aspects of the process are performed by another computer system, different from the endpoint, for instance one or more cloud or other computer systems that are remote from the endpoint to be protected.

The process begins by analyzing (402) the computer system. The analyzing may be performed on install of the tool and/or thereafter, perhaps periodically. A goal of the analysis may be to identify installed programs that are to be considered trusted. Another goal of the analysis may be to identify characteristics of the system in order to produce canary files that would appear realistic to potential malware if later installed on the system.

Figure 5:
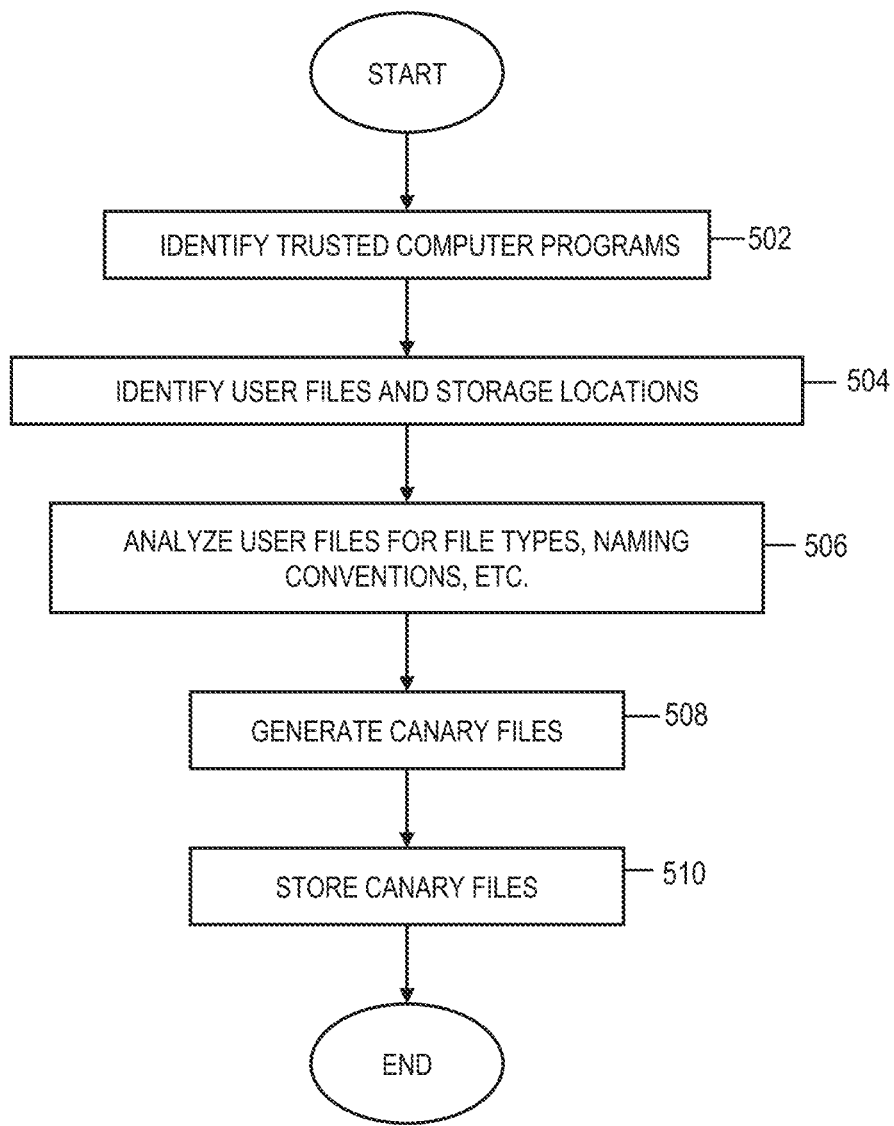
FIG. 5 depicts an example process for analyzing a computer system of a user, in accordance with aspects described herein.

An example process for this analyzing (402) of a computer system of a user is presented with reference to FIG. 5. The process of FIG. 5 could be performed by the computer system(s) performing an/all aspects of FIG. 4, or one or more other computer systems. The process of FIG. 5 identifies (502) a set of trusted computer programs of the computer system. As specific examples, it might identify the trusted programs of the system as (i) the most frequently used computer programs by a user of the computer system, (ii) the most recently used computer programs by the user of the computer system, and/or (iii) computer programs registered with the operating system as a default program for opening any of a set of predefined file types, such as .pdf and .doc/.docx files, among others. In other embodiments, programs that are to be considered trusted (assumed not to contain malware) could be identified using any other desired approach. Any computer processes that execute these trusted computer programs can be indicated as being trusted processes (at least initially) of those that the system might monitor (see FIG. 4 #404).

In the example of FIG. 5, the analysis also performs canary file generation. Thus, the process identifies (504) file system locations where the user stores user documents/data and analyzes (506) the user documents/data to identify file types, similarities in file names, and/or file content, as examples. This knowledge about what genuine user data on the computer system looks like can be useful in generating canary files that 'look' to malware like legitimate user data, which can be beneficial in targeting some forms of malware. The process continues by generating (508) the canary files, which uses at least one of the identified files from 504 (e.g. types/similarities in file names/content in selecting files type/file name/content at least some of the canary files generated), and then storing (510) the canary files to the computer system. In some examples, at least some of the generated canary files are stored to one or more of the identified file system locations (from 504), i.e. among other user data on the computer system.

Though in FIG. 5 the canary file generation and storage occurs as part of the analyzing, as mentioned previously this might instead be done as part of a different analysis/process, possibly by a different computer.

Returning to the process of FIG. 4, after analyzing the computer system (402), the process monitors actions (404) performed by each process of a plurality of processes when executing on a computer system, and maintains, for each process, an indication whether that process has been determined to be a trusted process of the computer system. The plurality of processes may be all or a subset of processes executing on the computer system. Monitoring the actions includes monitoring for calls to the operating system by the plurality of processes, i.e. monitoring for calls made by any of those processes. The calls include calls for file information of a directory of the computer system, calls for access to files on the computer system, calls to access a registry of the operating system, calls for process creation and termination, and/or calls for thread creation and termination, which can include calls for remote thread injection. These are just some examples of calls that are monitored-for, and others/alternatives could be monitored for in other embodiments.

In addition to monitoring the noted calls, monitoring the actions can further include monitoring for actions by those processes to encrypt or delete file(s), modify operating system file(s), create remote thread(s) in other process(es), reference to a registry of the operating system for any canary file(s), and/or modify canary file(s) using a deferred rename or delete operation, as examples.

The process of FIG. 4 also includes backing-up (406) files that are being accessed (e.g. requested for open) with change privileges by any process of the plurality of processes. Backing up these files can provide an unmodified copy of the file in case a piece of malware is requesting the change access in order to tamper with the file data. The files can be backed up to a protected location. The backing-up can be limited by backup parameters to control which files accessed with change privileges are backed up. For instance, the backup parameters can specify a defined set of file types/extensions to backup and/or specify a file size limit on files to backup.

The process continues by selectively presenting (408) canary files stored on the computer system to processes of the plurality of processes. In this manner, some process(es) may be notified of the presence of canary files, while some may not. For each process of the plurality of processes, whether to present canary files to that process is based on whether that process is indicated as being a trusted process: selectively presenting the canary files presents the canary files to process(es) not indicated as being trusted processes and hides the canary files from process(es) that are indicated as being trusted processes. It is noted that canary files may be presented to a process based on the process making any of possibly several different types of requests. An example such type of request is a call to query for file information of a directory of the computer system in which canary file(s) reside. If not a trusted process, the process may be alerted to those canary file(s) in that directory.

Based on such a call by a process indicated as being a trusted process of the plurality of processes, the selective presentation of the canary files includes hiding the canary file(s) in that directory from the process. Therefore, if determined that the process is a trusted process, the selectively presenting includes (i) parsing a data structure for reference(s) to canary file(s) in the directory. The data structure can be a data structure being returned by the operating system to the calling process in a call return. It also includes (ii) rebuilding the data structure to provide a rebuilt data structure that does not include the reference(s) to the canary file(s), and (iii) returning the rebuilt data structure as part of the call return to the process. The call return in this case does not indicate the canary file(s) to the calling process.

Similar to the hiding of canary files, the backed up file stored to the protected location can be hidden from processes, including even trusted processes. In some examples, the backup files are hidden from all processes executing on the computer system except a limited set that includes the tool. Thus, based on a call to query for file information of the protected location, hiding the backup files can (i) parse a data structure for reference(s) to backup file(s) in the protected location, the data structure being returned by the operating system in a call return to a process from which the backup files are to be hidden, (ii) rebuild the data structure to provide a rebuilt data structure that does not include the reference(s), and (iii) return the rebuilt data structure as part of the call return to the process, where the call return does not indicate the backup file(s) to the process.

Continuing with FIG. 4, the process scores (410) each of the plurality of processes based at least in part on the monitored actions performed by that process, and this including any actions by that process to access any of the canary files with change privileges. The scoring produces a malice score of that process, and therefore scoring the plurality of processes produces a respective malice score for each such process.

Differing monitored actions can have associated with them differing amounts by which the malice score of a process is adjusted when the actions are performed by the plurality of processes. For instance, encrypting a file may result in a larger adjustment to a malice score (to reflect greater potential malice) than an action to remotely inject a thread into another process. As actions are monitored and the adjustments to the malice score accumulate based on actions performed by the processes, the score may reach a point (threshold level of malice) at which the tool regards the process to be malicious. Some actions may be considered malicious per se and result in a malice score adjustment that immediately meets/exceeds that point at which the tool regards the process to be malicious. In this regard, monitoring the actions (404) can include monitoring for actions to access any of the canary files with change privileges. It may be assumed that a process that seeks to change a canary file is malicious. Thus, based on a process accessing a canary file with change privileges, the scoring adjusts the malice score of the process to indicate a level of malice meeting or exceeding the threshold level of malice.

The scoring of a process can be based not just on the monitored actions that the process performs but other factors as well, such as various properties of the process. One such property is the directory where an executable for the process is stored. If the directory is a temporary storage location or a location where executables are not commonly stored on the computer system, the scoring can adjust the malice score of the process to indicate a greater level of malice for that process. Other example properties include the process's relation to other processes, child and/or parent, and the malice scores of those processes. In some examples, the malice score of a process is a function of the malice score of children process(es) and/or parent process(es) of that process.

The processing of FIG. 4 also includes remedial actions against processes deemed to be sufficiently malicious. Thus, the process automatically terminates (412) each process, of the plurality of processes being monitored, for which the malice score of that process indicates at least a threshold level of malice in the execution of the process. The threshold can be automatically or manually defined, for instance by an administrator or other user. Since a process that accesses a canary file with change privileges is deemed to be malicious per se, the scoring (410) of that process can adjust the malice score of the process to indicate a level of malice meeting or exceeding the threshold level of malice, and therefore automatically terminate the process. In terminating a process deemed to be malicious, other, related processes could be terminated. Example related processes include child processes and/or parent processes. In some examples, all child processes of that process are terminated, as is its parent process. In other examples, only one or more child processes, or only the parent process, is terminated. Whether to terminate a related process could be based also on the malice score of such process, even if the malice score does not meet or exceed the aforementioned threshold. For instance, a second threshold could be used to determine when to terminate a related process of one being terminated based on meeting/exceeded the first threshold. The second threshold could be an intermediate threshold between the first threshold and a zero malice score—one that indicates no level of suspected malice.

In some examples, the relevant child process(es) for possible termination may include 'detached' child processes of the process being terminated. A process can spawn a 'detached' child process, which is one that is set to live on after the parent dies (e.g. is terminated). However, even these detached child processes can be targeted for termination if child process(es) are to be terminated.

In some situations, whether to terminate the parent process is a function of whether the parent process is a trusted process, in which the parent is terminated if it is not a trusted process, and is not terminated if it is a trusted process.

Monitoring (404) the actions of a process includes monitoring actions performed by each thread of that process. The scoring (410) of the process can score each such thread based at least in part on the monitored actions performed by that thread and produce a malice score of that specific thread. The malice score of the process may be the same or different from the malice score of any individual thread of the process. For instance, the malice score of the process could be a function of the malice score(s) of the process's thread(s). The action to automatically terminate (412) a process could be based on malice score(s) of its thread(s). In an example, the processing of FIG. 4 terminates a process based on the malice score of any thread of the process indicating at least the threshold level of malice. In another example, a process is terminated based on the sum of the malice scores of the threads of the process indicating at least the threshold level of malice. These are just examples of how thread malice scores could affect whether a process is terminated for suspected malice.

Additionally or alternatively, even a trusted process that is suspected of having become compromised is subject to termination. A thread of an otherwise trusted process may be regarded as untrusted. For instance, the thread may perform actions that raise its malice score and/or the thread may be untrusted on the basis that it was remotely injected into the process by another thread/process. In a situation where a trusted process has at least one untrusted thread among one or more trusted threads, the selectively presenting (408) the canary files hides the canary files from the trusted thread(s) of the trusted process and presents canary file(s) to the untrusted thread of the trusted process. If the untrusted process is malicious such that its malice score is adjusted to meet/exceed the threshold (for instance it accesses with change privileges any of the canary file(s) presented to it, then the entire trusted process can be automatically terminated.

Aspects of FIG. 4 can repeat continually until the tool is terminated, for instance on a system shut-down. Thus, the process returns to 404 to continue monitoring actions. The monitoring (404) may be a substantially continuous activity, with the process of FIG. 4 performing backup (406), selective presentation (hiding and/or presenting) of canary files (408), process scoring (410) and/or automatically terminating (412) if and when triggered based on the activities of the executing threads/processes.

Although various examples are provided, variations are possible without departing from a spirit of the claimed aspects.

Figure 6:
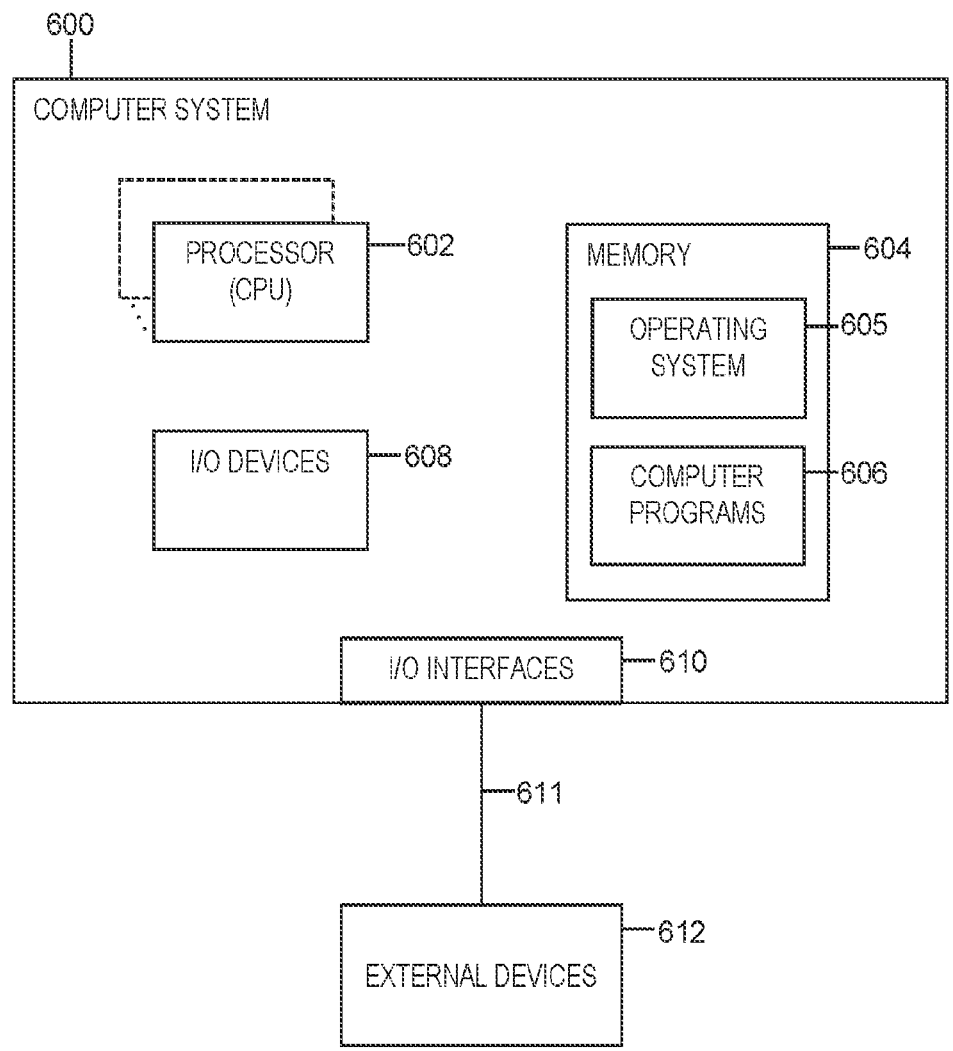
FIG. 6 depicts one example of a computer system and associated devices to incorporate and/or use aspects described herein.

Processes described herein may be performed singly or collectively by one or more computer systems, such as one or more user computer(s) and/or remote or cloud computers. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, California, USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor can be single or multi-core and can be capable of single-threaded and/or multi-threaded processing. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured and executed by processor(s) to cause the computer system to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media, such as magnetic media (typically called a "hard drive"), solid state drive(s), magnetic disk drive(s), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects of the present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, solid-state, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented, scripted, and/or procedural programming languages such as C, C++, C #, Java, Python, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. Provided is a small sampling of embodiments of the present disclosure, as described herein:

A1. A computer-implemented method comprising: monitoring actions performed by each process of a plurality of processes when executing on a computer system, and maintaining, for each process, an indication whether that process has been determined to be a trusted process of the computer system; selectively presenting canary files stored on the computer system to processes of the plurality of processes, wherein, for each process of the plurality of processes, whether to present canary files to that process is based on whether that process is indicated as being a trusted process, wherein the selectively presenting presents the canary files to processes not indicated as being trusted processes and hides the canary files from processes that are indicated as being trusted processes, and wherein the monitoring actions comprises monitoring for actions to access any of the canary files with change privileges; scoring each process of the plurality of processes based at least in part on the monitored actions performed by that process, including any actions by that process to access any of the canary files with change privileges, the scoring producing a malice score of that process; and automatically terminating each process, of the plurality of processes, for which the malice score of that process indicates at least a threshold level of malice in the execution of the process.

A2. The method of A1, further comprising analyzing the computer system, the analyzing comprising identifying a set of trusted computer programs as at least one selected from the group consisting of: (i) most frequently used computer programs by a user of the computer system, (ii) most recently used computer programs by the user of the computer system, and (iii) computer programs registered with the operating system as a default program for opening any of a set of predefined file types, wherein processes that execute the trusted computer programs are indicated as being trusted processes of the plurality of processes.

A3. The method of A2, wherein the analyzing the computer system further comprises: identifying file system locations where the user stores user documents; analyzing the user documents to identify file types and similarities in file names; generating the canary files, wherein the generating uses at least one of the identified file types and similarities in file names in selecting files type and file name of each of one or more of the canary files; and storing the canary files to the computer system, wherein at least some of the canary files are stored to one or more of the identified file system locations.

A4. The method of A1, A2 or A3, wherein the monitoring actions comprises monitoring for calls to the operating system by the plurality of processes, the calls comprising at least one selected from the group consisting of: calls for file information of a directory of the computer system, calls for access to files on the computer system, calls to access a registry of the operating system, calls for process creation and termination, and calls for thread creation and termination, the calls for thread creation comprising calls for remote thread injection.

A5. The method of A4, wherein the selectively presenting comprises, based on a call to query for file information of a directory of the computer system by a process indicated as being a trusted process of the plurality of processes, and on determining that the process is a trusted process: parsing a data structure for one or more references to one or more canary files in the directory, the data structure being returned by the operating system to the process in a call return; rebuilding the data structure to provide a rebuilt data structure that does not include the one or more references; and returning the rebuilt data structure as part of the call return to the process, wherein the call return does not indicate the one or more canary files to the process.

A6. The method of A1, A2, A3, A4 or A5, wherein the monitoring actions further includes monitoring for actions to: encrypt or delete one or more files, modify operating system files, create a remote thread in another process; reference to a registry of the operating system for a canary file of the canary files, and modify a canary file of the canary files using a deferred rename or delete operation, wherein differing monitored actions have associated therewith differing amounts by which the malice score of a process is adjusted when the actions are performed by the plurality of processes.

A7. The method of A6, wherein based on the process accessing a canary file with change privileges, the scoring adjusts the malice score of the process to indicate a level of malice meeting or exceeding the threshold level of malice, and the terminating automatically terminates the process.

A8. The method of A7, wherein the terminating also automatically terminates at least one selected from the group consisting of: a parent process of the process and a child process of the process.

A9. The method of A1, A2, A3, A4, A5, A6, A7 or A8, wherein the scoring further comprises scoring a process of the plurality of processes based on a directory where an executable for the process is stored, wherein based on the directory being a temporary storage location or a location where executables are not commonly stored on the computer system, the scoring adjusts the malice score of the process to indicate a greater level of malice.

A10. The method of A1, A2, A3, A4, A5, A6, A7, A8 or A9, wherein the monitoring actions comprises monitoring actions performed by each thread of each process of the plurality of processes, wherein the scoring scores each thread based at least in part on the monitored actions performed by that thread to produce a malice score of that thread.

A11. The method of A10, wherein the automatically terminating comprises terminating a process based on the malice score of any thread of the process indicating at least the threshold level of malice, or a sum of the malice scores of the threads of the process indicating at least the threshold level of malice.

A12. The method of A10 or A11, further comprising, based on suspecting that a trusted process of the plurality of processes has been compromised by malware executing as part of an untrusted thread of the trusted process, the untrusted thread having been remotely injected into the trusted process by another thread/process, the selectively presenting hides the canary files from one or more trusted threads of the trusted process and presents at least one of the canary files to the untrusted thread of the trusted process, and wherein the automatically terminating automatically terminates the process based on the untrusted thread accessing with change privileges any of the at least one of the canary files presented to the untrusted thread.

A13. The method of A1, A2, A3, A4, A5, A6, A7, A8, A9, A10, A11 or A12, wherein a process of the plurality of processes is a parent process to one or more children processes, and wherein the malice score of the process is a function of the malice score of the one or more children processes.

A14. The method of A1, A2, A3, A4, A5, A6, A7, A8, A9, A10, A11, A12 or A12, further comprising backing-up files accessed with change privileges by any process of the plurality of processes.

A15. The method of A14, wherein the backing-up is limited by backup parameters to control which files accessed with change privileges are backed up, wherein the backup parameters specify a defined set of file types to backup and specify a file size limit on files to backup.

A16. The method of A14 or A15, wherein the backing-up stores backup files to a protected location, wherein the method further comprises: hiding from the plurality of processes the backup files stored to the protected location, wherein, based on a call to query for file information of the protected location, the hiding parses a data structure for one or more references to one or more backup files in the protected location, the data structure being returned by the operating system to a process in a call return; rebuilding the data structure to provide a rebuilt data structure that does not include the one or more references; and returning the rebuilt data structure as part of the call return to the process, wherein the call return does not indicate the one or more backup files to the process.

A17. The method of A1, A2, A3, A4, A5, A6, A7, A8, A9, A10, A11, A12, A13, A14, A15 or A16, wherein the monitoring actions, the selectively presenting, the scoring, and the automatically terminating is implemented by execution as a kernel driver of the operating system executing on the computer system.

B1. A computer system configured to perform a method, the method comprising: monitoring actions performed by each process of a plurality of processes when executing on a computer system, and maintaining, for each process, an indication whether that process has been determined to be a trusted process of the computer system; selectively presenting canary files stored on the computer system to processes of the plurality of processes, wherein, for each process of the plurality of processes, whether to present canary files to that process is based on whether that process is indicated as being a trusted process, wherein the selectively presenting presents the canary files to processes not indicated as being trusted processes and hides the canary files from processes that are indicated as being trusted processes, and wherein the monitoring actions comprises monitoring for actions to access any of the canary files with change privileges; scoring each process of the plurality of processes based at least in part on the monitored actions performed by that process, including any actions by that process to access any of the canary files with change privileges, the scoring producing a malice score of that process; and automatically terminating each process, of the plurality of processes, for which the malice score of that process indicates at least a threshold level of malice in the execution of the process.

B2. The computer system of B1, wherein the method further comprises analyzing the computer system, the analyzing comprising identifying a set of trusted computer programs as at least one selected from the group consisting of: (i) most frequently used computer programs by a user of the computer system, (ii) most recently used computer programs by the user of the computer system, and (iii) computer programs registered with the operating system as a default program for opening any of a set of predefined file types, wherein processes that execute the trusted computer programs are indicated as being trusted processes of the plurality of processes.

B3. The computer system of B2, wherein the analyzing the computer system further comprises: identifying file system locations where the user stores user documents; analyzing the user documents to identify file types and similarities in file names; generating the canary files, wherein the generating uses at least one of the identified file types and similarities in file names in selecting files type and file name of each of one or more of the canary files; and storing the canary files to the computer system, wherein at least some of the canary files are stored to one or more of the identified file system locations.

B4. The computer system of B1, B2 or B3, wherein the monitoring actions comprises monitoring for calls to the operating system by the plurality of processes, the calls comprising at least one selected from the group consisting of: calls for file information of a directory of the computer system, calls for access to files on the computer system, calls to access a registry of the operating system, calls for process creation and termination, and calls for thread creation and termination, the calls for thread creation comprising calls for remote thread injection.

B5. The computer system of B4, wherein the selectively presenting comprises, based on a call to query for file information of a directory of the computer system by a process indicated as being a trusted process of the plurality of processes, and on determining that the process is a trusted process: parsing a data structure for one or more references to one or more canary files in the directory, the data structure being returned by the operating system to the process in a call return; rebuilding the data structure to provide a rebuilt data structure that does not include the one or more references; and returning the rebuilt data structure as part of the call return to the process, wherein the call return does not indicate the one or more canary files to the process.

B6. The computer system of B1, B2, B3, B4 or B5, wherein the monitoring actions further includes monitoring for actions to: encrypt or delete one or more files, modify operating system files, create a remote thread in another process, reference to a registry of the operating system for a canary file of the canary files, and modify a canary file of the canary files using a deferred rename or delete operation, wherein differing monitored actions have associated therewith differing amounts by which the malice score of a process is adjusted when the actions are performed by the plurality of processes.

B7. The computer system of B6, wherein based on the process accessing a canary file with change privileges, the scoring adjusts the malice score of the process to indicate a level of malice meeting or exceeding the threshold level of malice, and the terminating automatically terminates the process.

B8. The computer system of B7, wherein the terminating also automatically terminates at least one selected from the group consisting of: a parent process of the process and a child process of the process.

B9. The computer system of B1, B2, B3, B4, B5, B6, B7 or B8, wherein the scoring further comprises scoring a process of the plurality of processes based on a directory where an executable for the process is stored, wherein based on the directory being a temporary storage location or a location where executables are not commonly stored on the computer system, the scoring adjusts the malice score of the process to indicate a greater level of malice.

B10. The computer system of B1, B2, B3, B4, B5, B6, B7, B8 or B9, wherein the monitoring actions comprises monitoring actions performed by each thread of each process of the plurality of processes, wherein the scoring scores each thread based at least in part on the monitored actions performed by that thread to produce a malice score of that thread.

B11. The computer system of B10, wherein the automatically terminating comprises terminating a process based on the malice score of any thread of the process indicating at least the threshold level of malice, or a sum of the malice scores of the threads of the process indicating at least the threshold level of malice.

B12. The computer system of B10 or B11, wherein the method further comprises, based on suspecting that a trusted process of the plurality of processes has been compromised by malware executing as part of an untrusted thread of the trusted process, the untrusted thread having been remotely injected into the trusted process by another thread/process, the selectively presenting hides the canary files from one or more trusted threads of the trusted process and presents at least one of the canary files to the untrusted thread of the trusted process, and wherein the automatically terminating automatically terminates the process based on the untrusted thread accessing with change privileges any of the at least one of the canary files presented to the untrusted thread.

B13. The computer system of B1, B2, B3, B4, B5, B6, B7, B8, B9, B10, B11 or B12, wherein a process of the plurality of processes is a parent process to one or more children processes, and wherein the malice score of the process is a function of the malice score of the one or more children processes.

B14. The computer system of B1, B2, B3, B4, B5, B6, B7, B8, B9, B10, B11, B12 or B12, wherein the method further comprises backing-up files accessed with change privileges by any process of the plurality of processes.

B15. The computer system of B14, wherein the backing-up is limited by backup parameters to control which files accessed with change privileges are backed up, wherein the backup parameters specify a defined set of file types to backup and specify a file size limit on files to backup.

B16. The computer system of B14 or B15, wherein the backing-up stores backup files to a protected location, wherein the method further comprises: hiding from the plurality of processes the backup files stored to the protected location, wherein, based on a call to query for file information of the protected location, the hiding parses a data structure for one or more references to one or more backup files in the protected location, the data structure being returned by the operating system to a process in a call return; rebuilding the data structure to provide a rebuilt data structure that does not include the one or more references; and returning the rebuilt data structure as part of the call return to the process, wherein the call return does not indicate the one or more backup files to the process.

B17. The computer system of B1, B2, B3, B4, B5, B6, B7, B8, B9, B10, B11, B12, B13, B14, B15 or B16, wherein the monitoring actions, the selectively presenting, the scoring, and the automatically terminating is implemented by execution as a kernel driver of the operating system executing on the computer system.

C1. A computer program product comprising a computer readable storage medium storing instructions for execution to perform a method comprising: monitoring actions performed by each process of a plurality of processes when executing on a computer system, and maintaining, for each process, an indication whether that process has been determined to be a trusted process of the computer system; selectively presenting canary files stored on the computer system to processes of the plurality of processes, wherein, for each process of the plurality of processes, whether to present canary files to that process is based on whether that process is indicated as being a trusted process, wherein the selectively presenting presents the canary files to processes not indicated as being trusted processes and hides the canary files from processes that are indicated as being trusted processes, and wherein the monitoring actions comprises monitoring for actions to access any of the canary files with change privileges; scoring each process of the plurality of processes based at least in part on the monitored actions performed by that process, including any actions by that process to access any of the canary files with change privileges, the scoring producing a malice score of that process; and automatically terminating each process, of the plurality of processes, for which the malice score of that process indicates at least a threshold level of malice in the execution of the process.

C2. The computer program product of C1, wherein the method further comprises analyzing the computer system, the analyzing comprising identifying a set of trusted computer programs as at least one selected from the group consisting of: (i) most frequently used computer programs by a user of the computer system, (ii) most recently used computer programs by the user of the computer system, and (iii) computer programs registered with the operating system as a default program for opening any of a set of predefined file types, wherein processes that execute the trusted computer programs are indicated as being trusted processes of the plurality of processes.

C3. The computer program product of C2, wherein the analyzing the computer system further comprises: identifying file system locations where the user stores user documents; analyzing the user documents to identify file types and similarities in file names; generating the canary files, wherein the generating uses at least one of the identified file types and similarities in file names in selecting files type and file name of each of one or more of the canary files; and storing the canary files to the computer system, wherein at least some of the canary files are stored to one or more of the identified file system locations.

C4. The computer program product of C1, C2 or C3, wherein the monitoring actions comprises monitoring for calls to the operating system by the plurality of processes, the calls comprising at least one selected from the group consisting of: calls for file information of a directory of the computer system, calls for access to files on the computer system, calls to access a registry of the operating system, calls for process creation and termination, and calls for thread creation and termination, the calls for thread creation comprising calls for remote thread injection.

C5. The computer program product of C4, wherein the selectively presenting comprises, based on a call to query for file information of a directory of the computer system by a process indicated as being a trusted process of the plurality of processes, and on determining that the process is a trusted process: parsing a data structure for one or more references to one or more canary files in the directory, the data structure being returned by the operating system to the process in a call return; rebuilding the data structure to provide a rebuilt data structure that does not include the one or more references; and returning the rebuilt data structure as part of the call return to the process, wherein the call return does not indicate the one or more canary files to the process.

C6. The computer program product of C1, C2, C3, C4 or C5, wherein the monitoring actions further includes monitoring for actions to: encrypt or delete one or more files, modify operating system files, create a remote thread in another process, reference to a registry of the operating system for a canary file of the canary files, and modify a canary file of the canary files using a deferred rename or delete operation, wherein differing monitored actions have associated therewith differing amounts by which the malice score of a process is adjusted when the actions are performed by the plurality of processes.

C7. The computer program product of C6, wherein based on the process accessing a canary file with change privileges, the scoring adjusts the malice score of the process to indicate a level of malice meeting or exceeding the threshold level of malice, and the terminating automatically terminates the process.

C8. The computer program product of C7, wherein the terminating also automatically terminates at least one selected from the group consisting of: a parent process of the process and a child process of the process.

C9. The computer program product of C1, C2, C3, C4, C5, C6, C7 or C8, wherein the scoring further comprises scoring a process of the plurality of processes based on a directory where an executable for the process is stored, wherein based on the directory being a temporary storage location or a location where executables are not commonly stored on the computer system, the scoring adjusts the malice score of the process to indicate a greater level of malice.

C10. The computer program product of C1, C2, C3, C4, C5, C6, C7, C8 or C9, wherein the monitoring actions comprises monitoring actions performed by each thread of each process of the plurality of processes, wherein the scoring scores each thread based at least in part on the monitored actions performed by that thread to produce a malice score of that thread.

C11. The computer program product of C10, wherein the automatically terminating comprises terminating a process based on the malice score of any thread of the process indicating at least the threshold level of malice, or a sum of the malice scores of the threads of the process indicating at least the threshold level of malice.

C12. The computer program product of C10 or C11, wherein the method further comprises, based on suspecting that a trusted process of the plurality of processes has been compromised by malware executing as part of an untrusted thread of the trusted process, the untrusted thread having been remotely injected into the trusted process by another thread/process, the selectively presenting hides the canary files from one or more trusted threads of the trusted process and presents at least one of the canary files to the untrusted thread of the trusted process, and wherein the automatically terminating automatically terminates the process based on the untrusted thread accessing with change privileges any of the at least one of the canary files presented to the untrusted thread.

C13. The computer program product of C1, C2, C3, C4, C5, C6, C7, C8, C9, C10, C11 or C12, wherein a process of the plurality of processes is a parent process to one or more children processes, and wherein the malice score of the process is a function of the malice score of the one or more children processes.

C14. The computer program product of C1, C2, C3, C4, C5, C6, C7, C8, C9, C10, C11, C12 or C12, wherein the method further comprises backing-up files accessed with change privileges by any process of the plurality of processes.

C15. The computer program product of C14, wherein the backing-up is limited by backup parameters to control which files accessed with change privileges are backed up, wherein the backup parameters specify a defined set of file types to backup and specify a file size limit on files to backup.

C16. The computer program product of C14 or C15, wherein the backing-up stores backup files to a protected location, wherein the method further comprises: hiding from the plurality of processes the backup files stored to the protected location, wherein, based on a call to query for file information of the protected location, the hiding parses a data structure for one or more references to one or more backup files in the protected location, the data structure being returned by the operating system to a process in a call return; rebuilding the data structure to provide a rebuilt data structure that does not include the one or more references; and returning the rebuilt data structure as part of the call return to the process, wherein the call return does not indicate the one or more backup files to the process.

C17. The computer program product of C1, C2, C3, C4, C5, C6, C7, C8, C9, C10, C11, C12, C13, C14, C15 or C16, wherein the monitoring actions, the selectively presenting, the scoring, and the automatically terminating is implemented by execution as a kernel driver of the operating system executing on the computer system.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
monitoring actions performed by each process of a plurality of processes when executing on a computer system, the monitoring actions comprising monitoring actions performed by threads of the plurality of processes, and maintaining, for each process, an indication whether that process has been determined to be a trusted process of the computer system;
selectively presenting canary files stored on the computer system to processes of the plurality of processes, wherein, for each process of the plurality of processes, whether to present canary files to that process is based on whether that process is indicated as being a trusted process, wherein the selectively presenting presents the canary files and other files stored with the canary files in one or more directories to processes not indicated as being trusted processes, and hides the canary files from processes that are indicated as being trusted processes, and wherein the monitoring actions comprises monitoring for actions to access any of the canary files with change privileges;
scoring each process of the plurality of processes based at least in part on (i) the monitored actions performed by that process, including any actions by that process to access any of the canary files with change privileges, and (ii) scoring monitored actions of at least one thread of that process, wherein the scoring that process produces a malice score of that process; and
automatically terminating each process, of the plurality of processes, for which the malice score of that process indicates at least a threshold level of malice in the execution of the process.

2. The method of claim 1, further comprising analyzing the computer system, the analyzing comprising identifying a set of trusted computer programs as at least one selected from a group consisting of: (i) most frequently used computer programs by a user of the computer system, (ii) most recently used computer programs by the user of the computer system, and (iii) computer programs registered with the operating system as a default program for opening any of a set of predefined file types, wherein processes that execute the trusted computer programs are indicated as being trusted processes of the plurality of processes.

3. The method of claim 2, wherein the analyzing the computer system further comprises:
identifying file system locations where the user stores user documents;
analyzing the user documents to identify file types and similarities in file names;
generating the canary files, wherein the generating uses at least one of the identified file types and similarities in file names in selecting file type and file name of each of one or more of the canary files; and
storing the canary files to the computer system, wherein at least some of the canary files are stored to one or more of the identified file system locations.

4. The method of claim 1, wherein the monitoring actions comprises monitoring for calls to the operating system by the plurality of processes, the calls comprising at least one selected from a group consisting of: calls for file information of a directory of the computer system, calls for access to files on the computer system, calls to access a registry of the operating system, calls for process creation and termination, and calls for thread creation and termination, the calls for thread creation comprising calls for remote thread injection.

5. The method of claim 4, wherein the selectively presenting comprises, based on a call to query for file information of a directory of the computer system by a process indicated as being a trusted process of the plurality of processes, and on determining that the process is a trusted process:
parsing a data structure for one or more references to one or more canary files in the directory, the data structure being returned by the operating system to the process in a call return;
rebuilding the data structure to provide a rebuilt data structure that does not include the one or more references; and
returning the rebuilt data structure as part of the call return to the process, wherein the call return does not indicate the one or more canary files to the process.

6. The method of claim 1, wherein the monitoring actions further includes monitoring for actions to: encrypt or delete one or more files, modify operating system files, create a remote thread in another process, reference to a registry of the operating system for a canary file of the canary files, and modify a canary file of the canary files using a deferred rename or delete operation, wherein differing monitored actions have associated therewith differing amounts by which the malice score of a process is adjusted when the actions are performed by the plurality of processes.

7. The method of claim 6, wherein based on the process accessing a canary file with change privileges, the scoring adjusts the malice score of the process to indicate a level of malice meeting or exceeding the threshold level of malice, and the terminating automatically terminates the process.

8. The method of claim 7, wherein the terminating also automatically terminates at least one selected from a group consisting of: a parent process of the process and a child process of the process.

9. The method of claim 1, wherein the scoring further comprises scoring a process of the plurality of processes based on a directory where an executable for the process is stored, wherein based on the directory being a temporary storage location or a location where executables are not commonly stored on the computer system, the scoring adjusts the malice score of the process to indicate a greater level of malice.

10. The method of claim 1, wherein the monitoring actions comprises monitoring actions performed by each thread of each process of the plurality of processes, wherein the scoring scores each thread based at least in part on the monitored actions performed by that thread to produce a malice score of that thread.

11. The method of claim 10, wherein the automatically terminating comprises terminating a process based on the malice score of any thread of the process indicating at least the threshold level of malice, or a sum of the malice scores of the threads of the process indicating at least the threshold level of malice.

12. The method of claim 10, further comprising, based on suspecting that a trusted process of the plurality of processes has been compromised by malware executing as part of an untrusted thread of the trusted process, the untrusted thread having been remotely injected into the trusted process by another thread/process, the selectively presenting hides the canary files from one or more trusted threads of the trusted process and presents at least one of the canary files to the untrusted thread of the trusted process, and wherein the automatically terminating automatically terminates the trusted process based on the untrusted thread accessing with change privileges any of the at least one of the canary files presented to the untrusted thread.

13. The method of claim 1, wherein a process of the plurality of processes is a parent process to one or more children processes, and wherein the malice score of the process is a function of the malice score of the one or more children processes.

14. The method of claim 1, further comprising backing-up files accessed with change privileges by any process of the plurality of processes.

15. The method of claim 14, wherein the backing-up is limited by backup parameters to control which files accessed with change privileges are backed up, wherein the backup parameters specify a defined set of file types to backup and specify a file size limit on files to backup.

16. The method of claim 14, wherein the backing-up stores backup files to a protected location, wherein the method further comprises:
hiding from the plurality of processes the backup files stored to the protected location, wherein, based on a call to query for file information of the protected location, the hiding parses a data structure for one or more references to one or more backup files in the protected location, the data structure being returned by the operating system to a process in a call return;
rebuilding the data structure to provide a rebuilt data structure that does not include the one or more references; and
returning the rebuilt data structure as part of the call return to the process, wherein the call return does not indicate the one or more backup files to the process.

17. The method of claim 1, wherein the monitoring actions, the selectively presenting, the scoring, and the automatically terminating is implemented by execution as a kernel driver of the operating system executing on the computer system.

18. A computer program product comprising:
a non-transitory computer readable storage medium storing instructions for execution to perform a method comprising:
monitoring actions performed by each process of a plurality of processes when executing on a computer system, the monitoring actions comprising monitoring actions performed by threads of the plurality of processes, and maintaining, for each process, an indication whether that process has been determined to be a trusted process of the computer system;
selectively presenting canary files stored on the computer system to processes of the plurality of processes, wherein, for each process of the plurality of processes, whether to present canary files to that process is based on whether that process is indicated as being a trusted process, wherein the selectively presenting presents the canary files and other files stored with the canary files in one or more directories to processes not indicated as being trusted processes, and hides the canary files from processes that are indicated as being trusted processes, and wherein the monitoring actions comprises monitoring for actions to access any of the canary files with change privileges;
scoring each process of the plurality of processes based at least in part on (i) the monitored actions performed by that process, including any actions by that process to access any of the canary files with change privileges, and (ii) scoring monitored actions of at least one thread of that process, wherein the scoring that process produces a malice score of that process; and
automatically terminating each process, of the plurality of processes, for which the malice score of that process indicates at least a threshold level of malice in the execution of the process.

19. The computer program product of claim 18, wherein the method further comprises analyzing the computer system, the analyzing comprising identifying a set of trusted computer programs as at least one selected from a group consisting of: (i) most frequently used computer programs by a user of the computer system, (ii) most recently used computer programs by the user of the computer system, and (iii) computer programs registered with the operating system as a default program for opening any of a set of predefined file types, and wherein processes that execute the trusted computer programs are indicated as being trusted processes of the plurality of processes.

20. The computer program product of claim 18, wherein the monitoring actions comprises monitoring for calls to the operating system by the plurality of processes, the calls comprising at least one selected from a group consisting of: calls for file information of a directory of the computer system, calls for access to files on the computer system, calls to access a registry of the operating system, calls for process creation and termination, and calls for thread creation and termination, the calls for thread creation comprising calls for remote thread injection, and wherein the selectively presenting comprises, based on a call to query for file information of a directory of the computer system by a process indicated as being a trusted process of the plurality of processes, and on determining that the process is a trusted process:
  parsing a data structure for one or more references to one or more canary files in the directory, the data structure being returned by the operating system to the process in a call return;
  rebuilding the data structure to provide a rebuilt data structure that does not include the one or more references; and
  returning the rebuilt data structure as part of the call return to the process, wherein the call return does not indicate the one or more canary files to the process.

21. The computer program product of claim 18, wherein the monitoring actions further includes monitoring for actions to: encrypt or delete one or more files, modify operating system files, create a remote thread in another process, reference to a registry of the operating system for a canary file of the canary files, and modify a canary file of the canary files using a deferred rename or delete operation, wherein differing monitored actions have associated therewith differing amounts by which the malice score of a process is adjusted when the actions are performed by the plurality of processes, and wherein based on the process accessing a canary file with change privileges, the scoring adjusts the malice score of the process to indicate a level of malice meeting or exceeding the threshold level of malice, and the terminating automatically terminates the process.

22. The computer program product of claim 18, wherein the scoring further comprises scoring a process of the plurality of processes based on a directory where an executable for the process is stored, and wherein based on the directory being a temporary storage location or a location where executables are not commonly stored on the computer system, the scoring adjusts the malice score of the process to indicate a greater level of malice.

23. The computer program product of claim 18, wherein the monitoring actions comprises monitoring actions performed by each thread of each process of the plurality of processes, and wherein the scoring scores each thread based at least in part on the monitored actions performed by that thread to produce a malice score of that thread.

24. The computer program product of claim 23, wherein the automatically terminating comprises terminating a process based on the malice score of any thread of the process indicating at least the threshold level of malice, or a sum of the malice scores of the threads of the process indicating at least the threshold level of malice.

25. The computer program product of claim 23, wherein the method further comprises, based on suspecting that a trusted process of the plurality of processes has been compromised by malware executing as part of an untrusted thread of the trusted process, the untrusted thread having been remotely injected into the trusted process by another thread/process, the selectively presenting hides the canary files from one or more trusted threads of the trusted process and presents at least one of the canary files to the untrusted thread of the trusted process, and wherein the automatically terminating automatically terminates the trusted process based on the untrusted thread accessing with change privileges any of the at least one of the canary files presented to the untrusted thread.

26. The computer program product of claim 18, wherein a process of the plurality of processes is a parent process to one or more children processes, and wherein the malice score of the process is a function of the malice score of the one or more children processes.

27. A computer system comprising:
  a memory; and
  a processor in communication with the memory, wherein the computer system is configured to perform a method comprising:
    monitoring actions performed by each process of a plurality of processes when executing on a computer system, the monitoring actions comprising monitoring actions performed by threads of the plurality of processes, and maintaining, for each process, an indication whether that process has been determined to be a trusted process of the computer system;
    selectively presenting canary files stored on the computer system to processes of the plurality of processes, wherein, for each process of the plurality of processes, whether to present canary files to that process is based on whether that process is indicated as being a trusted process, wherein the selectively presenting presents the canary files and other files stored with the canary files in one or more directories to processes not indicated as being trusted processes, and hides the canary files from processes that are indicated as being trusted processes, and wherein the monitoring actions comprises monitoring for actions to access any of the canary files with change privileges;
    scoring each process of the plurality of processes based at least in part on (i) the monitored actions performed by that process, including any actions by that process to access any of the canary files with change privileges, and (ii) scoring monitored actions of at least one thread of that process, wherein the scoring that process produces a malice score of that process; and
    automatically terminating each process, of the plurality of processes, for which the malice score of that process indicates at least a threshold level of malice in the execution of the process.

28. The computer system of claim 27, wherein the method further comprises analyzing the computer system, the analyzing comprising identifying a set of trusted computer programs as at least one selected from a group consisting of: (i) most frequently used computer programs by a user of the computer system, (ii) most recently used computer programs by the user of the computer system, and (iii) computer programs registered with the operating system as a default program for opening any of a set of predefined file types, and wherein processes that execute the trusted computer programs are indicated as being trusted processes of the plurality of processes.

29. The computer system of claim 27, wherein the monitoring actions comprises monitoring for calls to the operating system by the plurality of processes, the calls comprising at least one selected from a group consisting of: calls for file information of a directory of the computer system, calls for access to files on the computer system, calls to access a registry of the operating system, calls for process creation and termination, and calls for thread creation and termination, the calls for thread creation comprising calls for remote thread injection, wherein the selectively presenting comprises, based on a call to query for file information of a directory of the computer system by a process indicated as being a trusted process of the plurality of processes, and on determining that the process is a trusted process:

parsing a data structure for one or more references to one or more canary files in the directory, the data structure being returned by the operating system to the process in a call return;

rebuilding the data structure to provide a rebuilt data structure that does not include the one or more references; and returning the rebuilt data structure as part of the call return to the process, wherein the call return does not indicate the one or more canary files to the process.

30. The computer system of claim 27, wherein the monitoring actions further includes monitoring for actions to: encrypt or delete one or more files, modify operating system files, create a remote thread in another process, reference to a registry of the operating system for a canary file of the canary files, and modify a canary file of the canary files using a deferred rename or delete operation, wherein differing monitored actions have associated therewith differing amounts by which the malice score of a process is adjusted when the actions are performed by the plurality of processes, and wherein based on the process accessing a canary file with change privileges, the scoring adjusts the malice score of the process to indicate a level of malice meeting or exceeding the threshold level of malice, and the terminating automatically terminates the process.

31. The computer system of claim 27, wherein the scoring further comprises scoring a process of the plurality of processes based on a directory where an executable for the process is stored, and wherein based on the directory being a temporary storage location or a location where executables are not commonly stored on the computer system, the scoring adjusts the malice score of the process to indicate a greater level of malice.

32. The computer system of claim 27, wherein the monitoring actions comprises monitoring actions performed by each thread of each process of the plurality of processes, and wherein the scoring scores each thread based at least in part on the monitored actions performed by that thread to produce a malice score of that thread.

33. The computer system of claim 32, wherein the automatically terminating comprises terminating a process based on the malice score of any thread of the process indicating at least the threshold level of malice, or a sum of the malice scores of the threads of the process indicating at least the threshold level of malice.

34. The computer system of claim 32, wherein the method further comprises, based on suspecting that a trusted process of the plurality of processes has been compromised by malware executing as part of an untrusted thread of the trusted process, the untrusted thread having been remotely injected into the trusted process by another thread/process, the selectively presenting hides the canary files from one or more trusted threads of the trusted process and presents at least one of the canary files to the untrusted thread of the trusted process, and wherein the automatically terminating automatically terminates the trusted process based on the untrusted thread accessing with change privileges any of the at least one of the canary files presented to the untrusted thread.

35. The computer system of claim 27, wherein a process of the plurality of processes is a parent process to one or more children processes, and wherein the malice score of the process is a function of the malice score of the one or more children processes.

* * * * *